(12) United States Patent
Ahn et al.

(10) Patent No.: US 9,800,999 B2
(45) Date of Patent: Oct. 24, 2017

(54) METHOD FOR MODIFYING M2M SERVICE SETTING AND APPARATUS THEREFOR

(71) Applicant: LG ELECTRONICS INC., Seoul (KR)

(72) Inventors: Hongbeom Ahn, Seoul (KR); Seongyun Kim, Seoul (KR); Heedong Choi, Seoul (KR); Seungmyeong Jeong, Seoul (KR); Seungkyu Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 77 days.

(21) Appl. No.: 14/768,690

(22) PCT Filed: Feb. 19, 2014

(86) PCT No.: PCT/KR2014/001352
§ 371 (c)(1),
(2) Date: Aug. 18, 2015

(87) PCT Pub. No.: WO2014/129802
PCT Pub. Date: Aug. 28, 2014

(65) Prior Publication Data
US 2016/0007137 A1 Jan. 7, 2016

Related U.S. Application Data

(60) Provisional application No. 61/766,675, filed on Feb. 19, 2013, provisional application No. 61/927,478, filed on Jan. 15, 2014.

(51) Int. Cl.
*H04L 12/28* (2006.01)
*H04L 12/50* (2006.01)
(Continued)

(52) U.S. Cl.
CPC ......... *H04W 4/005* (2013.01); *H04L 12/6418* (2013.01); *H04L 41/0681* (2013.01);
(Continued)

(58) Field of Classification Search
CPC .. H04W 4/005; H04L 41/0681; H04L 67/125; H04L 41/0816; H04L 67/12
See application file for complete search history.

(56) References Cited

U.S. PATENT DOCUMENTS 8,620,986 B2 * 12/2013 Wu ..................... H04L 43/0811
370/311
8,761,821 B2 * 6/2014 Tibbitts ................. H04W 48/04
455/297

(Continued)

FOREIGN PATENT DOCUMENTS

EP 2945326 A1 11/2015
JP 2012-104943 A 5/2012
(Continued)

*Primary Examiner* — Faruk Hamza
*Assistant Examiner* — Abu-Sayeed Haque
(74) *Attorney, Agent, or Firm* — Birch, Stewart, Kolasch & Birch, LLP

(57) ABSTRACT

The present invention relates to a method and apparatus for modifying a machine-to-machine (M2M) service setting in an M2M system, comprising the steps of: transmitting at least one policy information to at least one device, wherein each of the at least one policy information comprises scope information and condition information; and if the state of an M2M gateway corresponds to a state of which the condition information is indicative, transmitting a first notification indicative of a state change of the M2M gateway to a device of which the scope information is indicative.

18 Claims, 17 Drawing Sheets

(51) Int. Cl.
*H04L 5/14* (2006.01)
*G01R 31/08* (2006.01)
*H04W 4/00* (2009.01)
*H04L 12/64* (2006.01)
*H04L 12/24* (2006.01)
*H04L 29/08* (2006.01)
*H04W 88/16* (2009.01)

(52) U.S. Cl.
CPC ...... *H04L 41/0816* (2013.01); *H04L 41/0893* (2013.01); *H04L 67/12* (2013.01); *H04L 67/125* (2013.01); *H04W 4/001* (2013.01); *H04W 88/16* (2013.01)

(56) References Cited

U.S. PATENT DOCUMENTS

| | | | | |
|---|---|---|---|---|
| 2006/0046746 | A1* | 3/2006 | Ranford | H04W 48/04 455/456.5 |
| 2007/0156659 | A1* | 7/2007 | Lim | G06F 21/6227 |
| 2009/0262741 | A1* | 10/2009 | Jungck | H04L 29/12066 370/392 |
| 2012/0047551 | A1 | 2/2012 | Pattar et al. | |
| 2012/0327945 | A1 | 12/2012 | Li | |
| 2013/0088956 | A1* | 4/2013 | Zhou | H04W 4/08 370/230 |
| 2013/0203455 | A1 | 8/2013 | Takano | |
| 2013/0276076 | A1* | 10/2013 | Gupta | H04W 12/06 726/5 |
| 2013/0324157 | A1 | 12/2013 | Park et al. | |
| 2013/0336278 | A1 | 12/2013 | Kim et al. | |
| 2014/0040975 | A1* | 2/2014 | Raleigh | H04W 12/12 726/1 |
| 2014/0064232 | A1 | 3/2014 | Chang et al. | |
| 2015/0105044 | A1* | 4/2015 | Maguire | H04L 67/16 455/406 |

FOREIGN PATENT DOCUMENTS

| | | |
|---|---|---|
| JP | 2012-124603 A | 6/2012 |
| JP | 2012-175225 A | 9/2012 |
| JP | 2013-31203 A | 2/2013 |
| KR | 10-2012-0127050 A | 11/2012 |
| WO | WO 2012/115406 A2 | 8/2012 |
| WO | WO 2012/121552 A2 | 9/2012 |
| WO | WO 2012/150778 A2 | 11/2012 |

* cited by examiner

FIG. 10
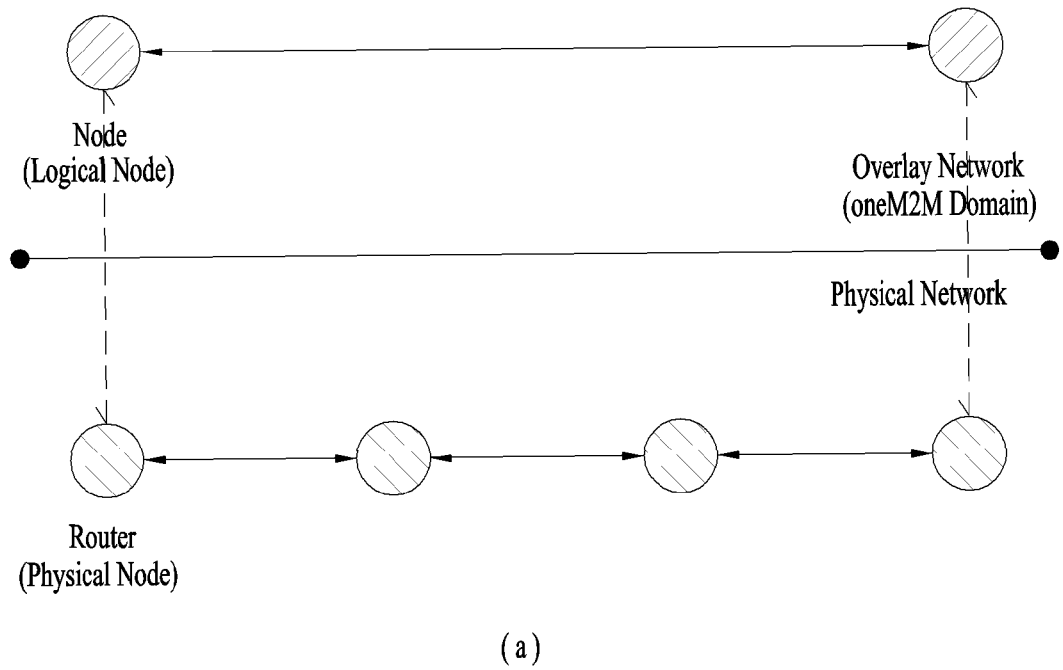
(a)
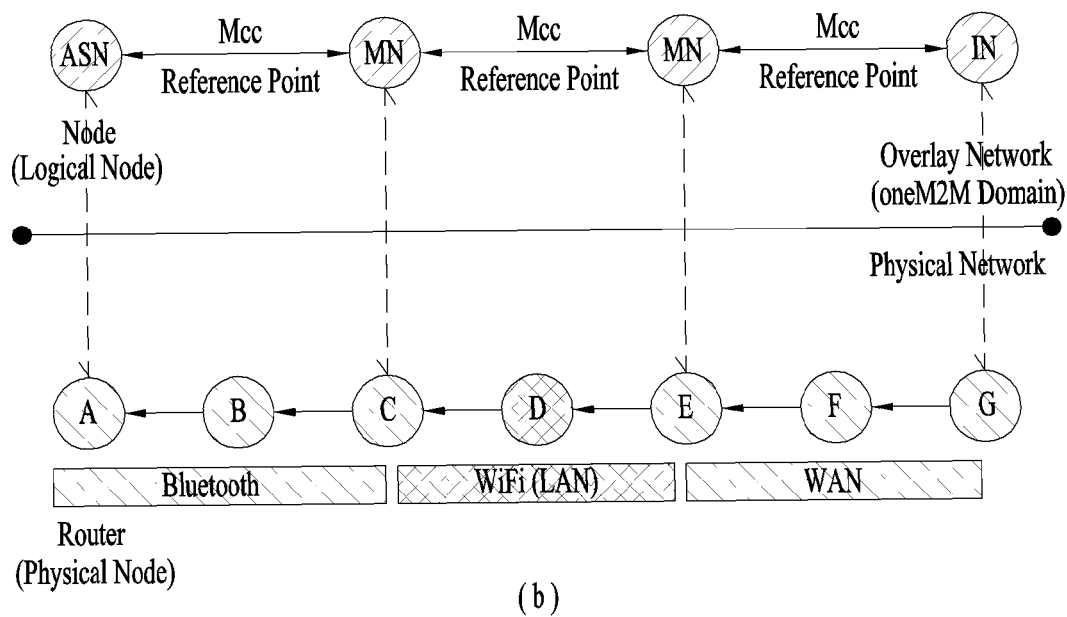
(b)

METHOD FOR MODIFYING M2M SERVICE SETTING AND APPARATUS THEREFOR

CROSS REFERENCE TO RELATED APPLICATIONS

This application is the National Phase of PCT International Application No. PCT/KR2014/001352, filed on Feb. 19, 2014, which claims priority under 35U.S.C. 119(e) to U.S. Provisional Application Nos. 61/766,675, filed on Feb. 19, 2013 and 61/927,478 filed on Jan. 15, 2014, all of which are hereby expressly incorporated by reference into the present application.

TECHNICAL FIELD

The present invention pertains to a wireless communication system, in particular, changing a service configuration in a machine-to-machine (M2M) system.

BACKGROUND ART

Recently, interest in M2M (machine-to-machine) communication is rising. The M2M communication corresponds to communication performed between machines without a human involvement. The M2M communication is also called MTC (machine type communication) or IoT (internet of things) communication. A terminal used for the M2M communication is called a M2M device. In general, the M2M device has characteristics such as low mobility, time tolerant or delay tolerant, small data transmission and the like. The M2M device is used in a manner of being connected with a M2M server, which stores and manages M2M communication information at the center. If a M2M device is connected according to a communication scheme different from each other, the M2M device and the M2M server are connected with each other via a M2M gateway in a section where a communication scheme is changed. In doing so, a whole M2M system can be constructed. Such a service as object tracking, power metering, automatic payment system, healthcare service, remote controlling, and the like can be provided by the M2M system.

The present invention relates to a M2M system.

DETAILED DESCRIPTION OF THE INVENTION

Technical Problem

An object of the present invention is to provide a method and apparatus for efficiently transmitting and receiving signals in an M2M system.

Another object of the present invention is to provide a method and apparatus for efficiently changing service configuration in an M2M system.

Another object of the present invention is to provide a method and apparatus for changing service configuration according to a state change of a specific device in an M2M system.

Another object of the present invention is to provide a method and apparatus for guaranteeing service persistency for a mobile terminal or a gateway in an M2M system.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

In an aspect of the present invention, provided herein is a method for changing a machine-to-machine (M2M) service configuration by an M2M gateway in an M2M system, comprising: transmitting at least one policy information to at least one device, wherein the at least one policy information includes scope information and condition information; and when a state of the M2M gateway corresponds to a state indicated by the condition information, transmitting a first notification indicating a state change of the M2M gateway to a device indicated by the scope information.

In another aspect of the present invention, provided herein is a machine-to-machine (M2M) gateway of an M2M system, comprising: a network interface unit; and a processor, wherein the processor is configured to transmit at least one policy information to at least one device through the network interface unit, and the at least one policy information includes scope information and condition information, and wherein the processor is further configured to, when a state of the M2M gateway corresponds to a state indicated by the condition information, transmit a first notification indicating a state change of the M2M gateway to a device indicated by the scope information.

Preferably, the first notification includes first identification information indicating one of the at least one policy information, and when the device indicated by the scope information receives the first notification, the device performs an M2M service according to policy information indicated by the first identification information.

Preferably, the at least one policy information includes limit policy information, the limit policy information including information indicating an allowed event category range of a request generated by the at least one device and information indicating a state of the M2M gateway to which the limit policy information is applied, and whether the request generated by the at least one device is transmitted to the M2M gateway is determined according to whether a state of the M2M gateway and the request is included in the allowed event category range.

Preferably, the at least one policy information includes default policy information, and when the at least one device does not receive the first notification, the at least one device performs an M2M service according to the default policy information.

Preferably, the at least one policy information includes default policy information, the default policy information including information indicating a default attribute of the request generated by the at least one device and information indicating a state of the M2M gateway to which the default policy information is applied, and when the state of the M2M gateway corresponds to a state to which the default policy information is applied and when a specific attribute of the request generated by the at least one device is not designated, the default attribute contained in the default policy information is applied.

Preferably, when the state of the M2M gateway transits from a state indicated by the condition information to another state, a second notification indicating a state change of the M2M gateway is transmitted to the device indicated by the scope information.

Preferably, the second notification includes second identification information indicating one of the at least one policy information, and when the device indicated by the scope information receives the second notification, the device performs an M2M service according to policy information indicated by the second identification information.

Preferably, a resource for subscription is created to transmit the first notification, the resource for subscription is created based on the scope information and the condition information, and the resource for subscription is created by the M2M gateway or a policy manager.

Preferably, the resource for subscription includes first information about an address of a device to which the notification is transmitted and second information about a criteria value at which the notification is performed, and creating the resource for subscription includes mapping the scope information to the first information and mapping a value of a state indicated by the condition information to the second information.

Preferably, the condition information includes an address value of information indicating a state of the M2M gateway and a condition value indicating a specific condition.

Preferably, the scope information includes identification information of an application instance or an application entity to which the policy information is applied.

Preferably, the limit policy information further includes information indicating a processing scheme for a request not transmitted to the M2M gateway.

Preferably, the processing scheme for the request includes transmitting all pending requests, transmitting the latest request, transmitting a request having an event category value of a specific range or a request having a lifespan of a specific range, or processing a request according to the next policy.

Preferably, the default policy information includes information indicating a default value for an event category of the request generated by the at least one device.

Advantageous Effects

According to the present invention, it is possible to efficiently transmit and receive signals in an M2M system.

Further, according to the present invention, it is possible to efficiently change service configuration in an M2M system.

Further, according to the present invention, it is possible to change service configuration according to a state change of a specific device in an M2M system.

Further, according to the present invention, it is possible to guarantee service persistency for a mobile terminal or a gateway in an M2M system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 10 exemplarily shows an overlay network structure of an M2M system.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

In some instances, well-known structures and devices are omitted in order to avoid obscuring the concepts of the present invention and important functions of the structures and devices are shown in block diagram form. The same reference numbers will be used throughout the drawings to refer to the same or like parts.

In the present invention, a machine-to-machine (M2M) device refers to a device for M2M communication. The M2M device may be fixed or mobile. The M2M device may transmit and receive user data and/or control information to/from an M2M server by communicating with the M2M server. The M2M device may be referred to as terminal equipment, Mobile Station (MS), Mobile Terminal (MT), User Terminal (UT), Subscriber Station (SS), wireless device, Personal Digital Assistant (PDA), wireless modem, handheld device, etc. The M2M server refers to a server for M2M communication, and is typically a fixed station or a mobile station. In the present invention, an M2M gateway refers to an apparatus serving as a connection point entering one network to another network when a network to which an M2M device is attached and a network to which an M2M server is attached are different from each other.

In addition, in the present specification, the term "entity" may refer to a hardware such as an M2M device, an M2M gateway, or an M2M server, or the term "entity" may refer to a software component of M2M application layer or M2M (common) service layer as described below.

Figure 1:
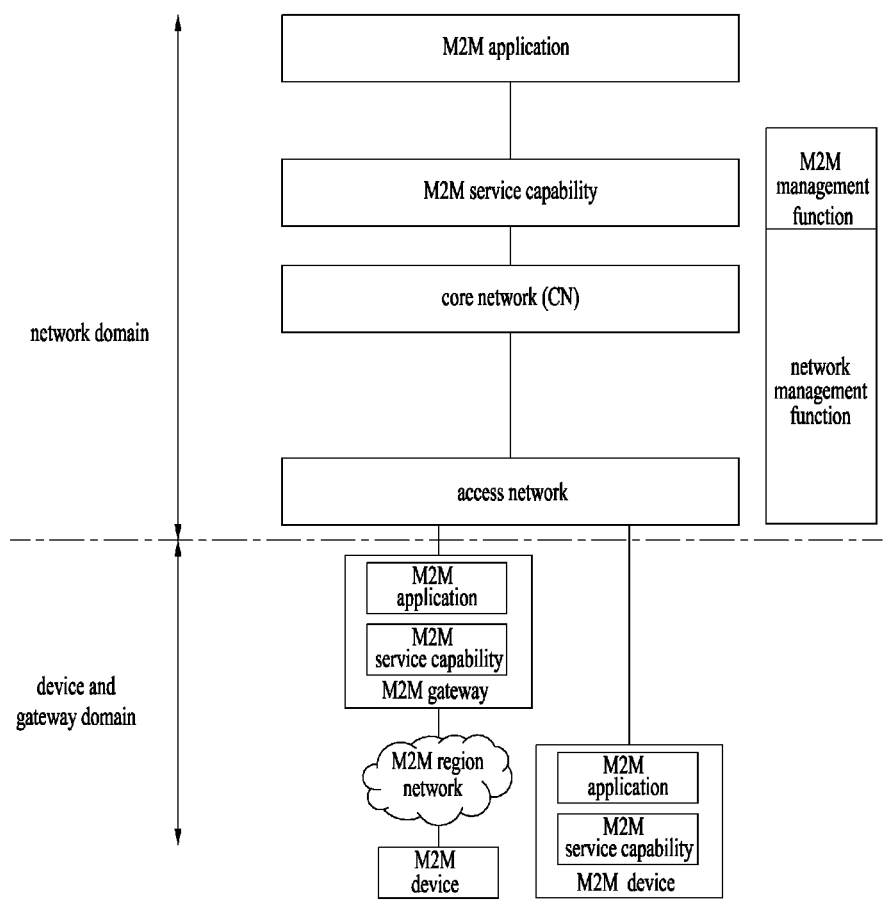
FIG. 1 shows an example of a M2M system.

FIG. 1 shows an example of a M2M system. FIG. 1 shows an example of a M2M system according to ETSI (European telecommunications standards institute) TS (technical specification).

The M2M system according to the ETSI TS defines a common M2M service framework for various M2M applications. A M2M application may indicate a software component implementing such a M2M service solution as e-health, city automation, a connected consumer, automotive and the like. The M2M system provides functions commonly necessary for implementing the various M2M applications and the commonly necessary functions can be called a M2M service or a M2M common service. If the M2M common service is used, a M2M application can be easily implemented without configuring a basic service framework again for each M2M application.

The M2M service is provided in a form of service capability (SC), the M2M application approaches to the SC (service capability) via an open interface and may be able use a M2M service provided by the SC (service capability). The SC (service capability) may correspond to a set of functions of a M2M service capable of being used when the M2M application is provided on a service framework. The SC (service capability) is a common name for an SC entity (service capability entity) and an SC layer (service capability layer).

The SC (service capability) can be represented as xSC. In this case, x can be represented by one of N, G and D. The x indicates where the SC (service capability) exists among a network (and/or a server), a gateway and a device. For instance, NSC indicates SC (service capability) existing in a network and/or a server and GSC indicates SC (service capability) existing in a gateway.

A M2M application may exist in a network, a gateway or a device. The M2M application existing in the network or a server in a manner of being directly connected with the server can be called a M2M network application or can be simply called a NA (network application). For instance, the NA corresponds to software which is implemented in a manner of being directly connected with a server and may be able to perform a role of communicating with a M2M gateway or a M2M device and managing the M2M gateway and the M2M device. The M2M application existing in the device can be called a M2M device application or can be simply called a DA (device application). For instance, the DA corresponds to software which is implemented in a M2M device and may be able to deliver sensor information and the like to the NA. The M2M application existing in the gateway can be called a M2M gateway application or can be simply called a GA (gateway application). For instance, the GA may play a role of managing a M2M gateway and may be able to provide SC (service capability) to the DA. The M2M application is a common name for an application entity (AE) and an application layer.

Referring to FIG. 1, a M2M system architecture can be divided into a network domain and a device and gateway domain. The network domain can include functions for M2M system management and functions for network management. The functions for the M2M system management can be performed by a M2M application managing devices existing in the device and gateway domain and M2M SC (service capability). The functions for the network management can be performed by a core network and an access network. Hence, in the example shown in FIG. 1, the core network and the access network provide connection between entities instead of performing a M2M function. M2M communication can be performed between M2M SC (service capability) in the network domain and the device and gateway domain via the core network and the access network. A M2M application of each domain can give and take a signal or information via M2M SC (service capability) of each domain.

The access network corresponds to an entity enabling the M2M device and gateway domain to communicate with the core network. Examples of the access network include xDSL (digital subscriber line), HFC (hybrid fiber coax), satellite, GERAN, UTRAN, e-UTRAN, wireless LAN, WiMAX and the like.

The core network corresponds to an entity providing such a function as IP (internet protocol) connection, service and network control, interconnection, roaming and the like. The core network includes a 3GPP ($3^{rd}$ generation partnership project) core network, an ETSI TISPAN (telecommunications and internet converged services and protocols for advanced networking) core network, a 3GPP2 core network and the like.

M2M SC (service capability) provides a M2M common service function (CSF) capable of being shared by various M2M network applications, exposures a M2M service via an open interface and enables M2M applications to use the M2M service. The M2M SC (service capability) entity can be comprehended as one instance of the common service functions (CSFs) and provides a subset of the common service functions (CSFs) capable of being used and shared by M2M applications. A M2M SCL (service capability layer) may correspond to a layer including the M2M SC entity.

A M2M application corresponds to an entity operating service logic and the entity capable of using M2M SC (service capability) via an open interface. A M2M application layer indicates a layer including the M2M application and a related operational logic.

A M2M device corresponds to an entity operating a M2M device application via M2M SC (service capability). The M2M device can directly communicate with a M2M server of a network domain and can communicate with the M2M server of the network domain via a M2M gateway. In case of being connected via the M2M gateway, the M2M gateway operates like a proxy. The M2M device can include a M2M application and/or M2M SC (service capability).

A M2M area network provides connectivity between the M2M device and the M2M gateway. In this case, a network between the M2M gateway and a M2M server and a network between the M2M device and the M2M gateway may be different from each other. For instance, the M2M area network can be implemented using such a PAN (personal area network) technology as IEEE 802.15.1, Zigbee, Bluetooth, IETF ROLL, ISA 100.11a and such a local network technology as PLC (power line communication), M-BUS, wireless M-BUS, KNX and the like.

The M2M gateway corresponds to an entity managing a M2M application via M2M SC (service capability) and the entity providing a service to the M2M application. The M2M gateway performs a role of a proxy between a M2M device and a network domain and can perform a role of providing a service to an ETSI non-compliant M2M device. The M2M gateway may correspond to an entity equipped with a function of a gateway among M2M devices. The M2M gateway can include a M2M application and/or M2M SC (service capability).

The M2M architecture shown in FIG. 1 is just an example and a name of each entity may vary. For instance, in a system according to an oneM2M technical specification, M2M SC (service capability) can be called a M2M common service entity (CSE) and an SCL (service capability layer) can be called a common service layer (CSL). And, a M2M application can be called an application entity (AE) and a M2M application layer can be simply called an application layer. Similarly, a name of each domain may vary as well. For instance, in oneM2M system, a network domain can be called an infrastructure domain and a device and gateway domain can be called a field domain.

As shown in FIG. 1, a M2M system can be comprehended as a layered structure including a M2M application layer and a M2M SC (service capability) layer for M2M communication.

Figure 2:
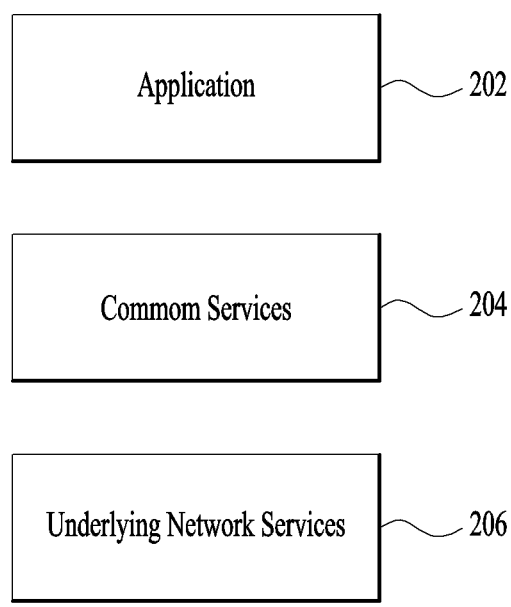
FIG. 2 shows an example of a layered structure of a M2M system.

FIG. 2 shows an example of a layered structure of a M2M system.

Referring to FIG. 2, a M2M system can include an application layer 202, a common service layer 204 and an underlying network services layer 206. As mentioned in the foregoing description, the application layer 202 corresponds to a M2M application layer and the common service layer 204 may correspond to a M2M SCL. The underlying network services layer 206 provides such services as device management, a location service and device triggering existing in a core network to the common service layer 204.

Figure 3:
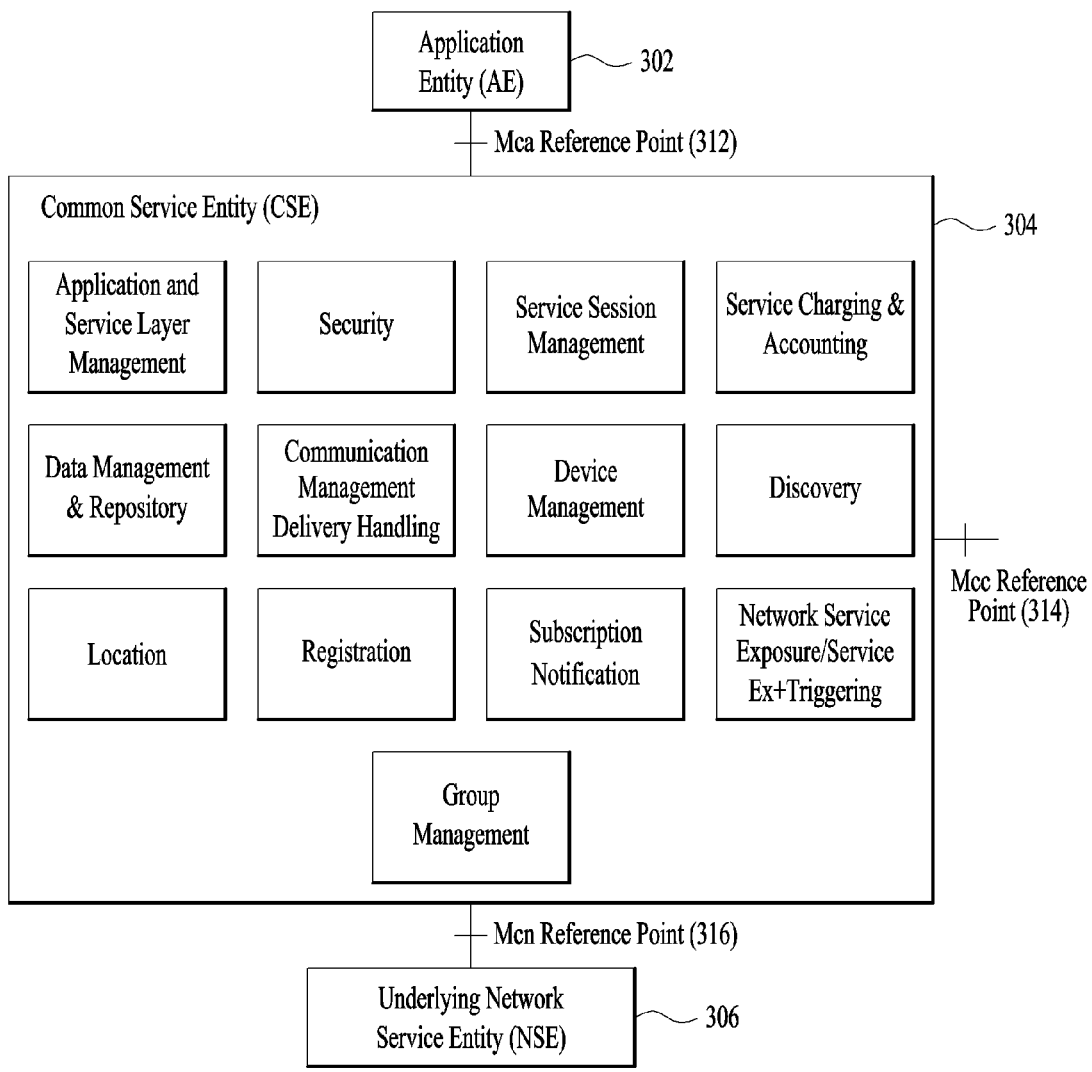
FIG. 3 shows an example of a functional architecture of a M2M system.

FIG. 3 shows an example of a functional architecture of a M2M system. In terms of functionality, M2M system architecture can include an application entity (AE) 302, a common service entity (CSE) 304, and an underlying network service entity (NSE) 306. Each of the entities 302/304/306 can communicate with each other via a reference point supported by the common service entity 304. The reference point plays a role in designating a communication flow between each of the entities 302/304/306. The reference point can be represented as Mcx and Mc means "M2M communications". In the present specification, a Mca reference point, a Mcc reference point and a Men reference point can be represented as Mca, Mcc and Men, respectively.

Referring to FIG. 3, a Mca reference point 312 designates a communication flow between the application entity (AE) 302 and the common service entity (CSE) 304. The Mca reference point 312 enables the AE 302 to use a service provided by the CSE 304 and enables the CSE 304 to communicate with the AE 302. The Mca reference point 312 may indicate an interface between a M2M application layer and a M2M common service layer.

A Mcc reference point 314 designates a communication flow between common service entities (CSEs) 304 different from each other. The Mcc reference point 314 enables the CSE 304 to use a service of a different CSE when the CSE 304 provides necessary functions. A service provided by the Mcc reference point 314 may be dependent on the functions supported by the CSE 304. The Mcc reference point 314 may indicate an interface between M2M common service layers.

A Mcn reference point 316 designates a communication flow between the CSE 304 and the underlying network service entity (NSE) 306. In order to make the CSE 304 provide required functions, the Mcn reference point 316 enables the CSE to use a service provided by the NSE 306. The Mcn reference point 312 may indicate an interface between the M2M common service layer and the M2M underlying network layer.

In the example shown in FIG. 3, the CSE 304 can provide various common service functions (CSFs). For instance, the CSE 304 can include at least one selected from the group consisting of an application and service layer management function, a communication management and delivery handling function, a data management and repository function, a device management function, a group management function, a discovery function, a location function, a network service exposure/service execution and triggering function, a registration function, a security function, a service charging and accounting function, a service session management function, and a subscription/notification function. The CSE 304 indicates an instance of the common service functions and provides a subset of the common service functions capable of being used and shared by M2M applications. The common service functions are schematically explained in the following.

Application and service layer management (ASM): provides a management function of AEs and CSEs. For instance, the ASM function configures functions of the CSEs, troubleshoots the functions of the CSEs and upgrades the functions. Moreover, the ASN function can upgrade a function of the AEs.

Communication management and delivery handling (CMDH): provides communication with different CSEs, AEs and NSEs. For instance, the CMDH function determines timing and a method of using a connection for CSE-to-CSE communication and can control specific requests to be delivered in a manner of being delayed.

Data management and repository (DMR): enables M2M applications to exchange and share data with each other. For instance, the DMR function collects great amount of data, aggregates the data with each other, convert the data into a specific format and can store the converted data.

Device management (DMG): manages a device function not only for a M2M gateway and a M2M device but also for devices existing in a M2M area network. For instance, the DMG function can perform application installation and configuration, firmware update, logging, monitoring, diagnostics, network topology management and the like.

Discovery (DIS): searches for information such as information and a resource within a given range and condition according to a request.

Group management (GMG): For instance, a group can be generated in a manner of combining a resource and a M2M device or a M2M gateway with each other, this function handles a group-related request.

Location (LOC): This function enables a M2M application to obtain location information of a M2M device or a M2M gateway.

Network service exposure/service execution and triggering (NSSE): enables communication of an underlying network to be performed and makes a service or a function provided by the underlying network available.

Registration (REG): This function enables a M2M application or a different CSE to register at a specific CSE. Registration is performed to use a M2M service function of the specific CSE.

Security (SEC): performs a role in handling of sensitive data such as a security key, establishing security-related association, authentication, authorization, protecting ID (identity) and the like.

Service charging and accounting (SCA): performs a role in providing a charging function to a CSE.

Service session management (SSM): performs a role in managing a M2M session of a service layer for end-to-end communication.

Subscription/notification (SUB): when a change for a specific resource is subscribed, if the resource is changed, performs a role in notifying the change.

Figure 4:
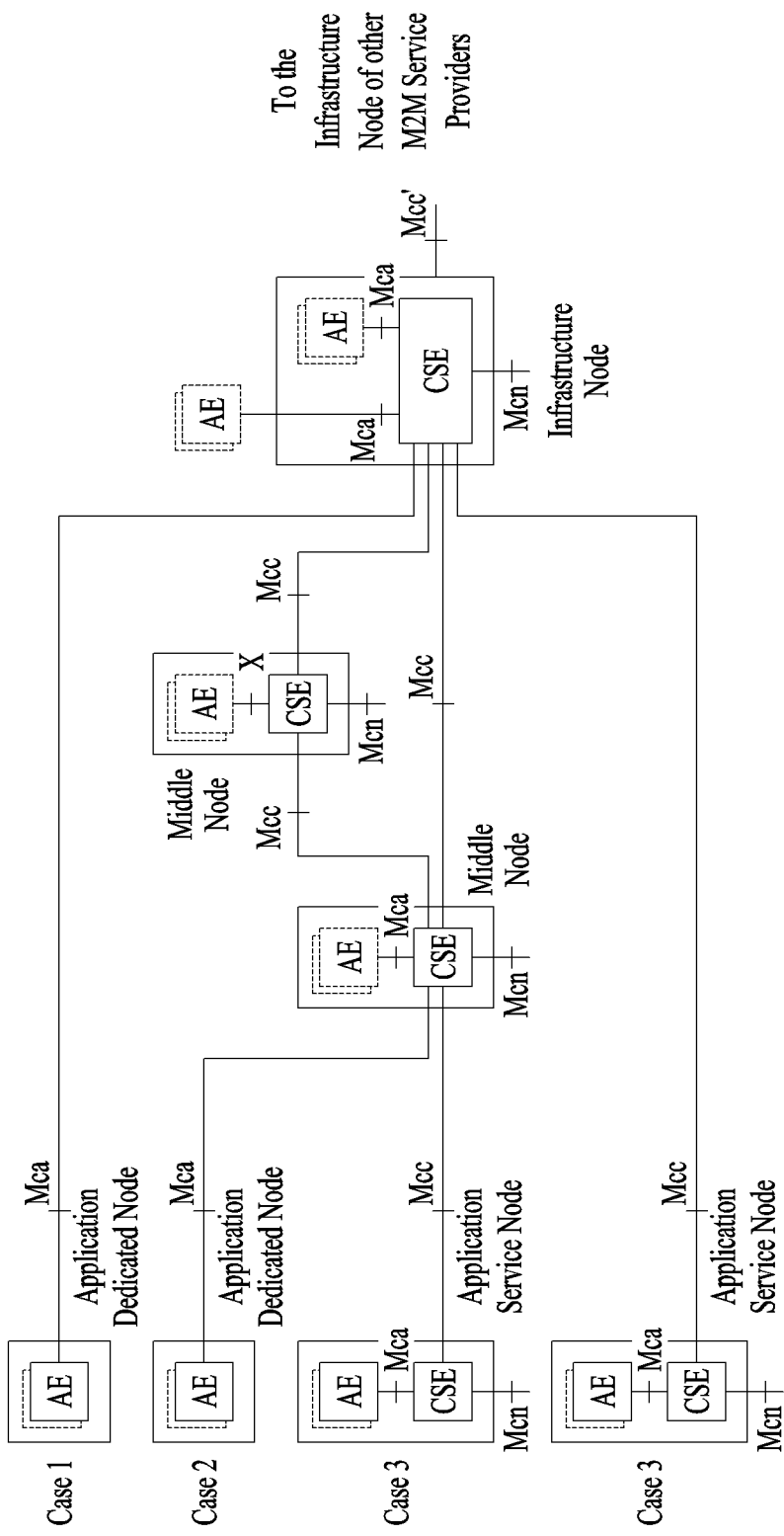
FIG. 4 is a diagram for an example of a M2M system configuration.

FIG. 4 is a diagram for an example of a M2M system configuration. In the present specification, a node corresponds to an entity including one or more M2M applications or an entity including one CSE and a M2M application equal to or greater than 0.

Although an application dedicated node (ADN) includes at least one or more application entities (AEs), the application dedicated node (AND) may indicate a node not including a common service entity (CSE). The ADN can communicate with a middle node (MN) or an infrastructure node (IN) via a Mca. The ADN can be called a M2M device having a constrained capability. In this case, the M2M device having a constrained capability may correspond to a M2M device not including a common service layer or a common service entity (CSE). The M2M device having a constrained capability can be simply called a constrained M2M device.

An application service node (ASN) includes at least one or more common service entities (CSEs) and may indicate a node including at least one or more M2M application entities (AEs). The ASN can communicate with one middle node or an infrastructure node via a Mcc. The ASN can be called a M2M device.

A middle node (MN) may indicate a node including one common service entity (CSE) and M2M application entity (AE) equal to or greater than 0. The MN can communicate with an infrastructure node (IN) or a different middle node (MN) via a Mcc. Or, the MN can communicate with the IN/MN/ASN via the Mcc. Or, the MN can communicate with the ADN via the Mca. The MN can be called a M2M gateway.

An infrastructure node (IN) includes a common service entity (CSE) and may indicate a node including an application entity (AE) equal to or greater than 0. The IN can communicate with at least one or more middle nodes (MNs) and/or at least one or more ASNs. Or, the IN can communicate with one or more ADNs via a Mcs. The IN can be called a M2M server.

Referring to FIG. 4, a case 1 shows an example of communication performed between an ADN 402 and an IN 422. The ADN 402 may correspond to a M2M device having a constrained capability. In this case, since the ADN 402 does not include a CSE or a common service layer, the ADN can communicate with a CSE of the IN 422 via the Mca. In this case, since the ADN 402 does not include a CSE or a common service layer, the ADN is unable to store data generated by an AE or an application layer. Hence, in the case 1, the data generated by the AE or the application layer of the ADN 402 can be stored in the CSE of the IN 422.

A case 2 shows an example of communication performed between an ADN 404 and an MN 414. The ADN 404 may also correspond to a M2M device having a constrained capability. Hence, the ADN can operate similar to an operation of the case 1 except a point that the ADN 404 is communicating with a CSE of the MN 414. In particular, the ADN 404 can communicate with the CSE of the MN 414 via the Mca. And, since the ADN 404 does not include a CSE or a common service layer, the ADN is unable to store data generated by an AE or an application layer. Hence, the data generated by the AE or the application layer of the ADN 404 can be stored in the CSE of the IN 414.

Meanwhile, in the case 2, the MN 414 can communicate with the IN 422 via an MN 412. In this case, the MN 414 and the MN 412 can communicate with each other and the MN 412 and the IN 422 can communicate with each other via the Mcc. The MN 414 can communicate with the IN 422 without passing through the MN 412.

A case 3 shows an example of communication performed between an ASN 406 and the MN 414. Unlike the case 1 or the case 2, since the ASN 406 includes a CSE or a common service layer, data generated by an AE or an application layer of the ASN 406 can be stored in the CSE or the common service layer of the ASN 406. And, the AE of the ASN 406 can communicate with a CSE of the MN 414 via the CSE of the ASN 406.

A case 4 shows an example of communication performed between an ASN 408 and the MN 414. Compared to the case 3, a CSE of the ASN 408 can directly communicate with a CSE of the IN 422 without passing through the MN.

The IN 422/424 can be positioned at an infrastructure domain or a network domain and can include one CSE and an AE equal to or greater than 0. The INs 422/424 can communicate with each other via the Mcc.

Figure 5:
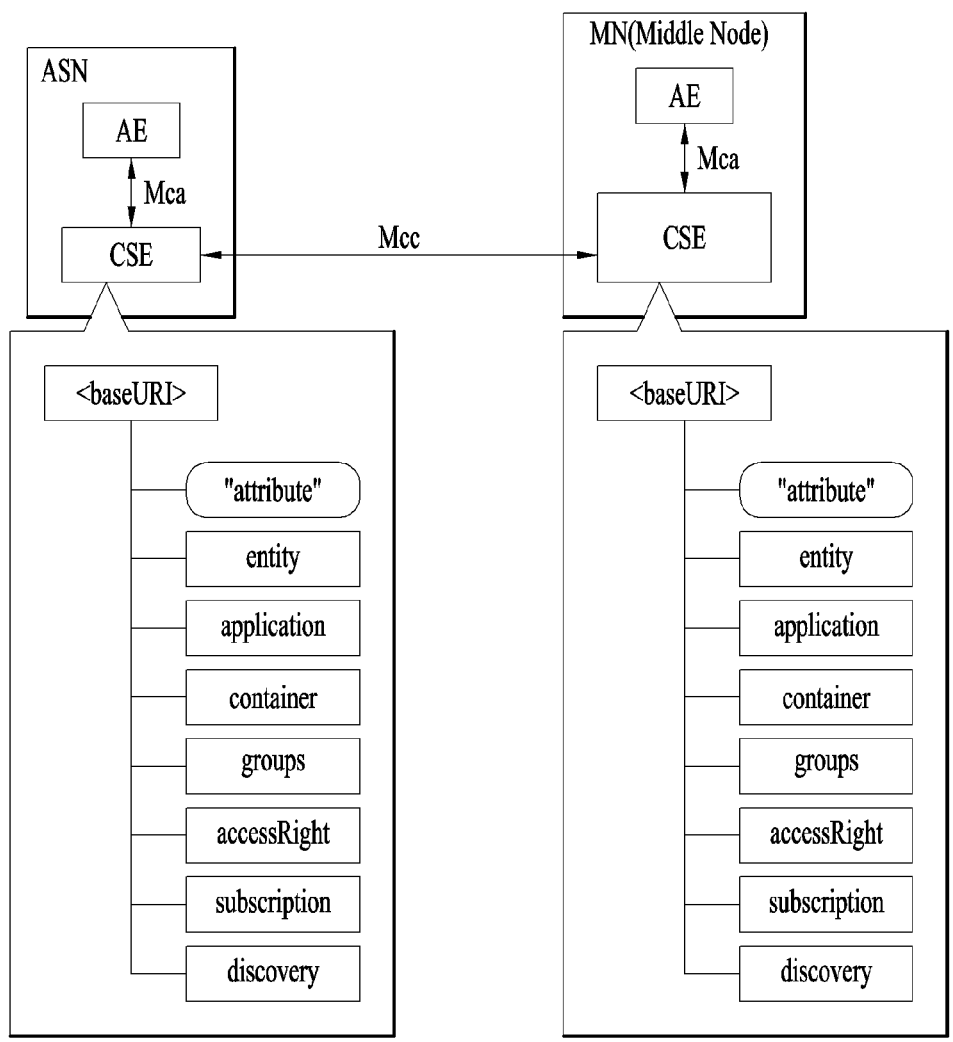
FIG. 5 is a diagram for an example of resources used in a M2M system.

FIG. 5 is a diagram for an example of resources used in a M2M system.

In a M2M system, an application entity (AE), a CSE, data and the like can be represented as a resource. In the M2M system, the resource indicates a data structure capable of being uniquely addressed using a unique address (e.g., URI (universal resource identifier or uniform resource identifier)). In the M2M system, the resource may have a tree structure, can be managed and stored by a CSE or a common service layer and can be logically connected with each other. Hence, a M2M device, a M2M gateway, a CSE or a common service layer of a M2M server can include the resource. On the contrary, an AE or an application layer of the M2M system is unable to have the resource. In a M2M resource including a tree structure, a baseURI corresponds to a root resource and the baseURI can include an attribute and a child resource.

Various resources are defined in a M2M system. M2M applications can perform communication based on the resources. For instance, the resources can be used for a M2M service such as registration of an application, reading a sensor value and the like. When an instance is generated, unique address information (e.g., URI) is given to each resource. Similar to a root resource, each resource can include an attribute and a child resource. Each resource can be addressed using unique address information.

An attribute stores information on a resource itself and is unable to include a child resource. A child resource can include an attribute of the child resource and a child resource of its own. For instance, a child resource includes a CES resource, an application resource, an access right resource, a container resource, a group resource, a subscription resource, a discovery resource and the like.

The CSE resource corresponds to a resource existing at a lower part of a baseURI/entity and includes information of a different CSE registered (connected) at a corresponding CSE.

The application resource corresponds to a resource existing at a lower part of a baseURI/application or a baseURI/entity/(specific CSE)/application. If the application resource exists at the lower part of the baseURI/application, information of applications registered (connected) at a corresponding CSE is stored. If the application resource exists at the lower part of the baseURI/entity/(specific CSE)/application, information of applications registered at a CSE named as "(specific CSE)" is stored.

The access right resource corresponds to a resource existing at a lower part of a baseURI/accessRight and the resource storing information on an access right. Authorization can be performed using access right information included in the present resource.

The container resource corresponds to a resource existing at a lower part of a bseURI/container and stores data generated according to a CSE or an AE.

The group resource corresponds to a resource existing at a lower part of a baseURI/group and provides a function capable of processing various resources in a manner of binding the resources with each other.

The subscription resource corresponds to a resource existing at a lower part of a baseURI/subscription and performs a function of notifying a change of a state of the resource via a notification.

The discovery resource corresponds to a resource existing at a lower part of a baseURI/discovery and is used for discovering a specific resource.

Figure 6:
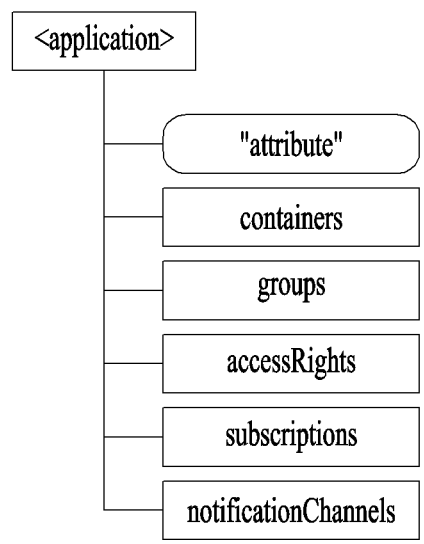
FIG. 6 is a diagram for an example of a resource for a specific M2M application.

FIG. 6 is a diagram for an example of a resource for a specific M2M application. As mentioned in the foregoing description, the resource for the specific M2M application can be stored in a CSE of a M2M gateway or an application resource of a resource of a common service layer. Similar to the root resource, the resource for the specific M2M application can include an attribute and a child resource. In FIG. 6, a notificationChannels resource may correspond to a resource related to the subscription resource.

Figure 7:
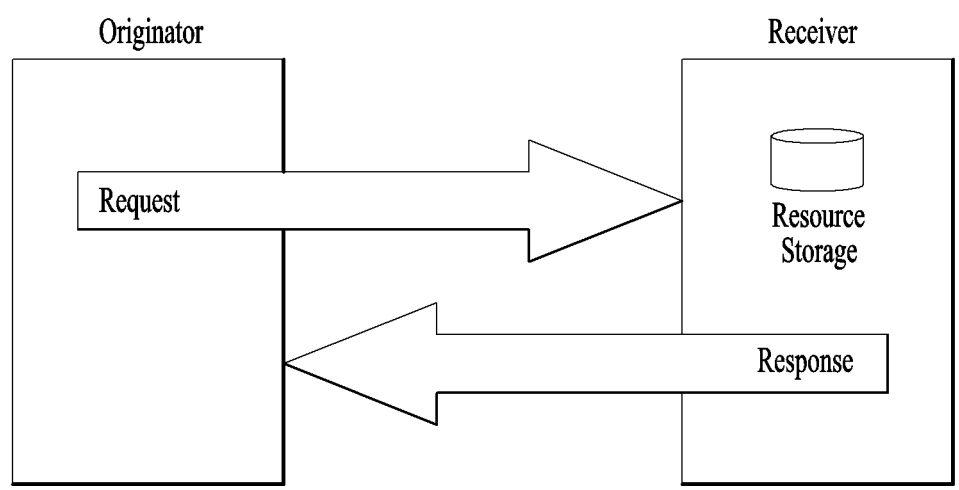
FIG. 7 exemplarily shows a communication flow of a general M2M system.

FIG. 7 exemplarily shows a communication flow of a general M2M system. Generally, the operations of the M2M system may be carried out on the basis of data exchange. For example, in order to stop an operation of another device, a specific device may transmit a corresponding command to the another device in a form of data. In order to store data in a device, a specific-format data structure is used, and this specific-format data structure is referred to as a resource. The resource may be accessible using a unique address (e.g., URI).

Referring to FIG. 7, a Request and Response Scheme may be used for AE-to-CSE connection or CSE-to-CSE connection. An originator may transmit a request message to a receiver so as to request the stored resources from the receiver, and may receive a response message in response to the request message. Likewise, the receiver may receive a request message for requesting resources from the originator, and may transmit a response message to the originator upon receiving the request message. In this specification, the request message may also be referred to as a request, and the response may also be referred to as a response. The request messages to be transmitted from the originator to the receiver may have the following information.

op: a form of operation to be executed. 'op' may be one of Create, Retrieve, Update, and Delete.
to: URI of a target resource.
fr: identification information (or ID) of an originator having generated the request.
mi: meta information regarding the corresponding request.
cn: content of a resource to be transferred.

If the corresponding request is successfully carried out, the response message may include the following information. The response message may include at least one of the following information, or may include only the result value (rs).

to: identification information (or ID) of an originator having generated the request.
fr: identification information (or ID) of a receiver having received the request.
mi: meta information regarding the request.
rs: the result (e.g., Okay, Okay and Done, Okay and in progress) of the request.
ai: additional information.
cn: content of a resource to be transmitted.

If the corresponding request fails, the response message may include the following information.

to: an originator having generated the request.
fr: ID of a receiver having received the request.
mi: meta information regarding the request.
rs: the result (e.g., Not Okay) of the request.
ai: additional information FIG. 8 exemplarily shows different entities interoperating with each other in an M2M system.

Figure 8:
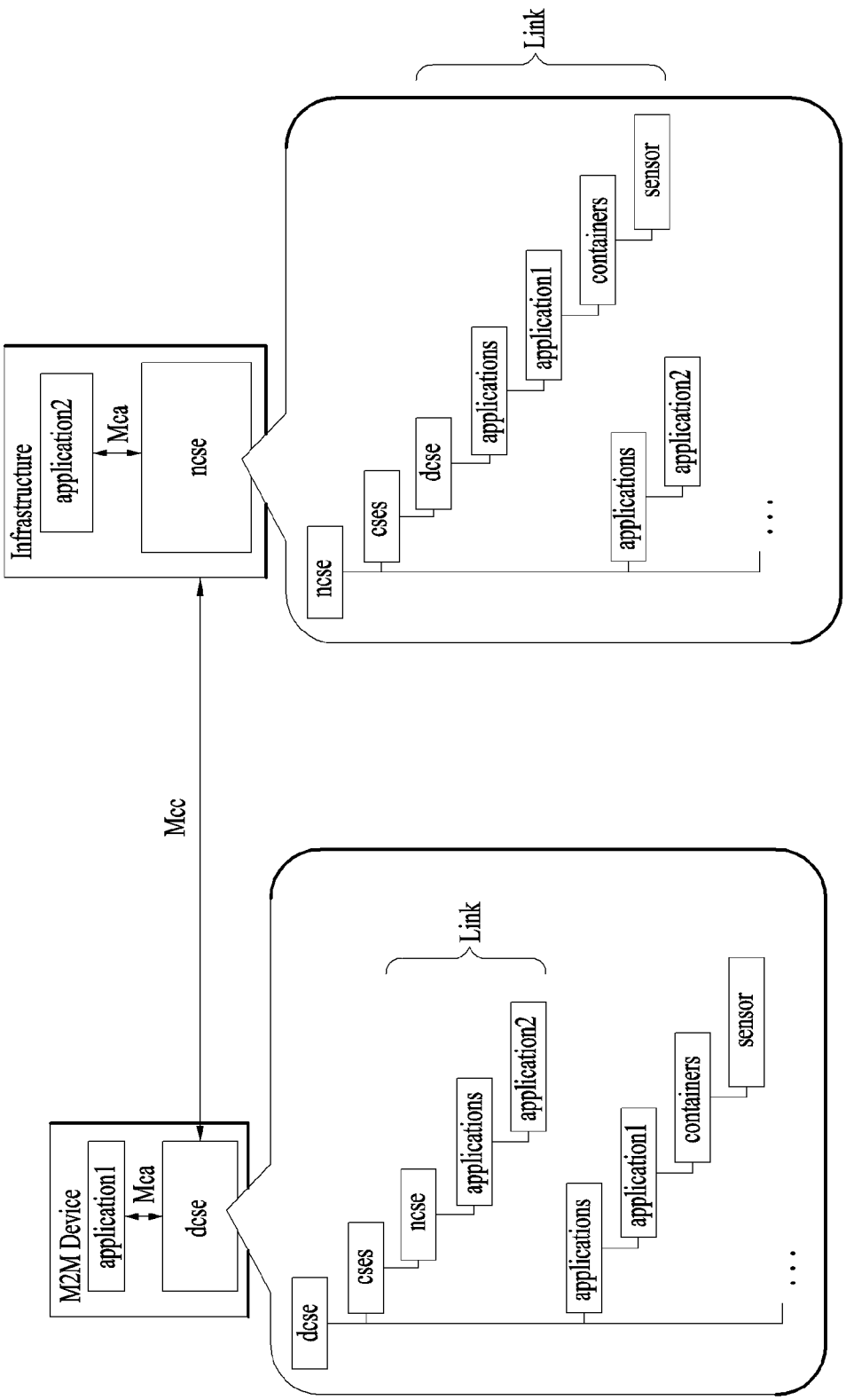
FIG. 8 exemplarily shows different entities interoperating with each other in an M2M system.

Referring to FIG. 8, AE (application 2) registered in an Infrastructure Node (IN) interoperates with an M2M device. For example, the M2M device may include a sensor which is a physical device, and the AE registered in the IN may read a sensor value of the M2M device.

AE (application 1) on the M2M device may read a value from the sensor and store the read value in the form of a resource (e.g. <container> resource) into a CSE (dcse) to which the AE (application 1) registered. For this purpose, AE (application 1) on the M2M device must first register to the CSE on the M2M device. As shown in FIG. 8, upon completion of registration, information related to the registered M2M application may be stored in the form of 'dcse/applications/application1' resource. For example, if a sensor value of the M2M device is stored by AE (application 1) in a 'Container' resource corresponding to a child resource of 'dcse/applications/application1' resource, AE (application2) having registered in the IN (Infrastructure Node) may access the corresponding value. In addition, in order for the AE (application2) to access the M2M device, the AE (application2) must register to the CSE (ncse) of the IN (Infrastructure Node). In the same manner as the AE (application1) registering to the CSE (dsce), information about AE (application2) is stored in 'ncse/applications/application2' resource. In addition, AE (application1) may communicate through a CSE (ncse) and a CSE (dcse) in the middle instead of directly communicating with the AE (application2). For this purpose, CSE (nxse) and CSE (dcse) must register to each other. If CSE (dcse) register to CSE (ncse), dsce related information (e.g., link) may be stored in a child resource of 'ncse/cses/dcse' resource. As a result, AE (application2) may acquire a path through which the AE (application2) can access information of the AE (application1), such that the AE (application2) can read the sensor value through the corresponding path.

Figure 9:
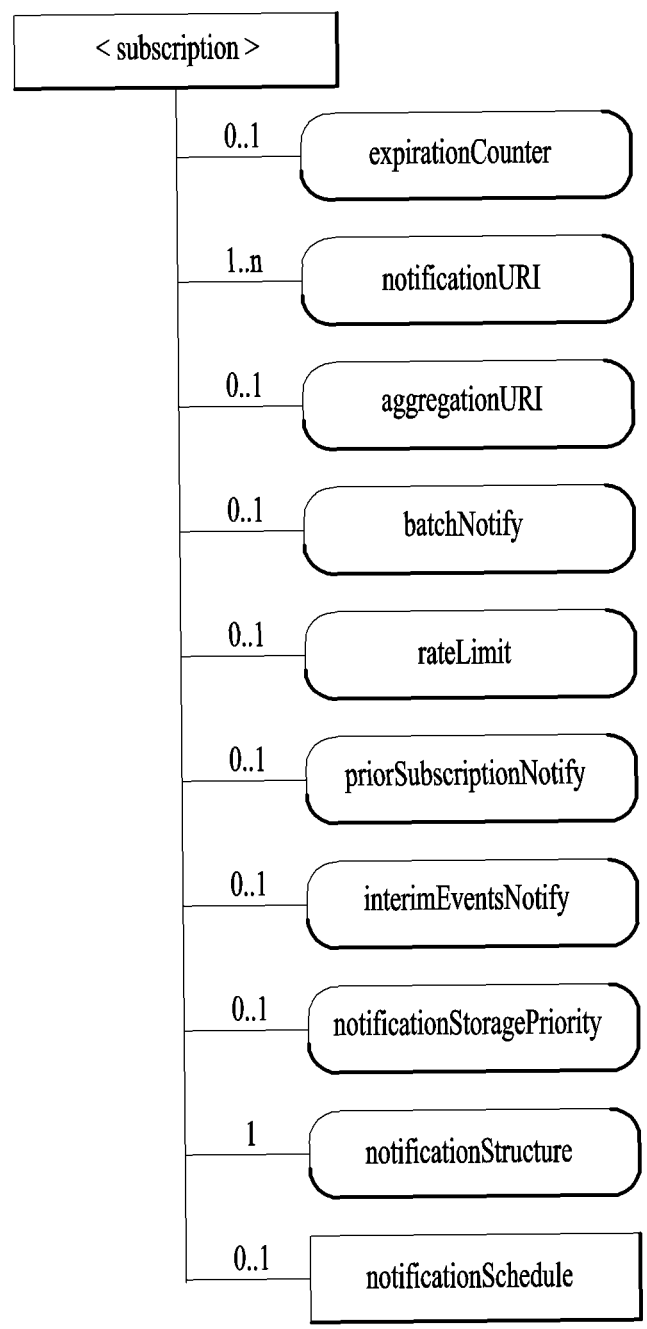
FIG. 9 exemplarily shows a resource for subscription.

FIG. 9 exemplarily shows a resource for subscription. In the M2M system (e.g., one M2M), an entity having an interest in a change of a resource may subscribe to notification of the corresponding change of the resource. In this case, in order to subscribe to such notification, a resource for subscription must be established. The resource for subscription may be referred to as a subscription resource or <subscription> resource.

The subscription resource may include information about a 'subscribed-to resource'. The relationship between the subscribed-to resource and the subscription resource may be represented as a parent-child relationship. For example, <container> resource having a subscribed-to resource may include a <subscription> resource as a child resource. When a parent subscribed-to resource is deleted, a <subscription> resource may be deleted.

In case that a subscription resource is a child resource, according to setting (attribute setting) of the subscription resource, a notification message indicating a state change of the parent resource may be transmitted to an entity specified by a 'notificationURI' attribute contained in the subscription resource. If the originator has 'RETRIEVE' permission for a subscribable resource, the originator may establish a subscription resource. The originator of the subscription resource becomes a resource subscriber. If the subscribed-to resource is modified, this modification is compared with a reference attribute, and it is determined whether a notification is to be transmitted to a resource subscriber.

Referring to FIG. 9, as a non-limiting example, a <subscription> resource may have various attributes and child resources. For example, a <subscription> resource may include a 'notificationSchedule' resource that includes scheduling information for notification delivery as a child resource. In addition, for example, a <subscription> resource may have attributes shown in Table 1. In Table 1, R/W may indicate a read/write (R/W) permission for the corresponding attribute, and may be one of READ/WRITE (RW), READ ONLY (RO), and WRITE ONLY (WO). In addition, multiplicity shown in Table 1 may indicate how many times the corresponding attribute can occur in a <subscription> resource.

TABLE 1

| Attribute Name of <subscription> | Multiplicity | RW/ RO/ WO | Description |
|---|---|---|---|
| resourceType (rT) | 1 | WO | Resource Type. This WO resourceType attribute stores <in a two capital letters token> the information useful for procedure processing, e.g. CO for <container>, CI for <instance>. |
| expirationTime (eT) | 1 | RW | Time/date after which the resource will be deleted by the hosting CSE. This attribute can be provided by the issuer, and in such a case it will be regarded as a hint to the hosting CSE on the lifetime of the resource. The hosting CSE can however decide on the real expirationTime. If the hosting CSE decides to change the expirationTime attribute value, this is communicated back to the Originator. The lifetime of the resource can be extended by providing a new value for this attribute in an UPDATE verb. Or by deleting the attribute value, e.g. by not providing the attribute when doing a full UPDATE, in which case the hosting CSE can decide on a new value. |
| parentID (pID) | 1 | RO | The flat URI used to identify the parent resource without using the full structured URI. |
| creationTime (cT) | 1 | RO | Time/date of creation of the resource. |
| lastModifiedTime (lMT) | 1 | RO | Last modification time/date of the resource. |
| filterCriterion (fC) | 0 . . . 1 | RW | Criteria to be used to filter the results. They can either be used in a GET (as query parameters) or in a subscription. |
| labels (lBs) | 1 | RW | Tokens used as keys for discovering resources. |
| accessRightID (aRI) | 0 . . . 1 | RW | The URI of an <access rights> resource. The permissions defined in the <accessRight> resource that are referenced determine who is allowed to access the resource containing this attribute for a specific purpose (e.g., Retrieve, Update, Delete etc.). If no accessRightID is given at the time of creation, the accessRightID of the parent resource is linked to this attribute. |
| expirationCounter | 0 . . . 1 | RW | When the number of notifications becomes the same as this counter, the <subscription> resource shall be deleted. |
| notificationURI | 1 . . . n | RW | URI where the resource subscriber will receive notifications. |
| aggregationURI | 0 . . . 1 | RW | URI to aggregate notifications from group members of a <group> resource. |
| batchNotify | 0 . . . 1 | RW | Indicates that notifications should be batched for delivery. When set, notification events are temporarily stored until either a specified number is ready to send or until a duration after the first noticifaction event has expired. |
| rateLimit | 0 . . . 1 | RW | Indicates that notifications should be rate-limited. When set, notification events that exceed a specified number within a specified time are temporarily stored then sent when the number of events sent per specified time falls below the limit. |
| priorSubscriptionNotify | 0 . . . 1 | WO | Indicates that when this subscription is created, whether notification events prior to subscription should be sent, e.g. send prior "n" notifications, if available. |
| interimEventsNotify | 0 . . . 1 | RW | Indicates the notification action to be taken following a period of unreachability, when the resource subscriber becomes reachable (e.g. send "n" iterim notificiations, if available.) |
| notificationStoragePriority | 0 . . . 1 | RW | Indicates a priority for this subscription relative to other subscriptions belonging to this same subscriber for retention of notification events when storage is congested. The storage congestion policy which uses this attribute as input is specified in section TBD. |

TABLE 1-continued

| Attribute Name of <subscription> | Multiplicity | RW/ RO/ WO | Description |
|---|---|---|---|
| notificationStructure | 1 | RW | Type of information that shall be contained in notifications. E.g., modified attribute only of a subscribed-to resource, a whole subscribed-to resource, and/or URI of a corresponding <subscription> resource. |

FIG. 10 exemplarily shows an overlay network structure of an M2M system.

An M2M system (e.g., one M2M) may be composed of an overlay network structure. The overlay network may conceptually indicate a virtual network constructed on a physical network. A node within the overlay network structure may be connected with a virtual or logical link. For example, as described above, ADN, ASN, MN, IN, etc. may be mapped to the node contained in the overlay network structure for use in one M2M. Each link may pass through many physical links within the actual physical network, and may not consider a physical link for communication or for actual operation. For example, referring to FIG. 10(a), a connection composed of four-hop connection may appear in the actual network, while the connection may appear as a connection composed of 2-hop connection in the overlay network. The term 'hop' may collectively refer to a node-to-node connection present in a network.

The reason why the actual physical network node is different from the overlay network node (i.e., overlay node) is as follows.

1. A node may be generated due to a functional difference. For example, a device configured to perform a special function in a physical network may be assigned to an overlay node.

2. There may be a difference in upper nodes due to a difference in connected networks. For example, referring to FIG. 10(b), a physical network may be connected to Bluetooth, Wi-Fi, or WAN (Wide Area Network), and there may be a gateway per each network. In this case, each gateway may be seen as a node in an overlay network.

Figure 11:
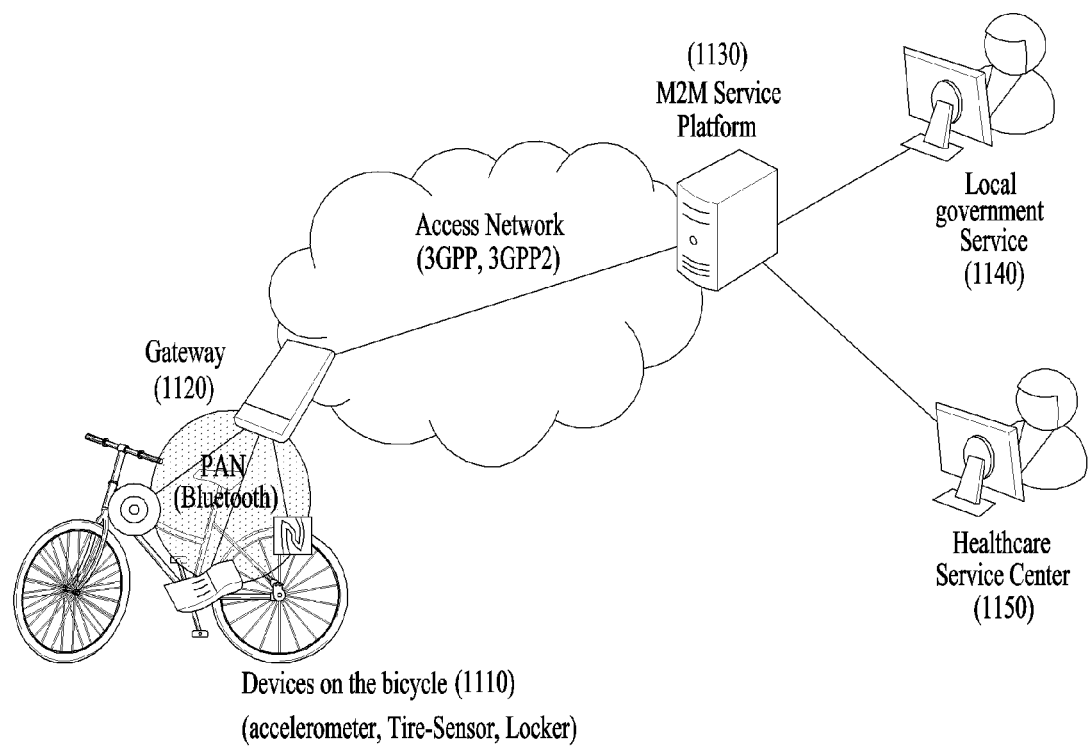
FIG. 11 exemplarily shows an M2M system.

FIG. 11 exemplarily shows an M2M system.

Referring to FIG. 11, the M2M system may provide an M2M service for sharing a bicycle. In FIG. 11, in order to transmit information of various sensors 1110 contained in the bicycle to an M2M service platform 1130, a smartphone 1120 may be used as a gateway. For example, the sensing information of the bicycle may include a position, heart-rate information of a bicycle user, and a tire pressure. The sensors 1110 may periodically transmit the sensing information, so as to enable a local government service 1140 providing the bicycle sharing service and a healthcare service center 1150 to provide the M2M service for a bicycle user.

In the example of FIG. 11, the reason why a gateway device must be passed through is that devices (e.g., Accelerometer, Tire-Sensor, Locker) existing in a gateway inner network referred to as PAN (Personal Area Network) or in an M2M area network cannot be connected to an access network such as 3GPP, 3GPP2. The gateway may interpret and convert a message between an area network protocol and an access network protocol, and the gateway may be functionally connected to both networks.

Figure 12:
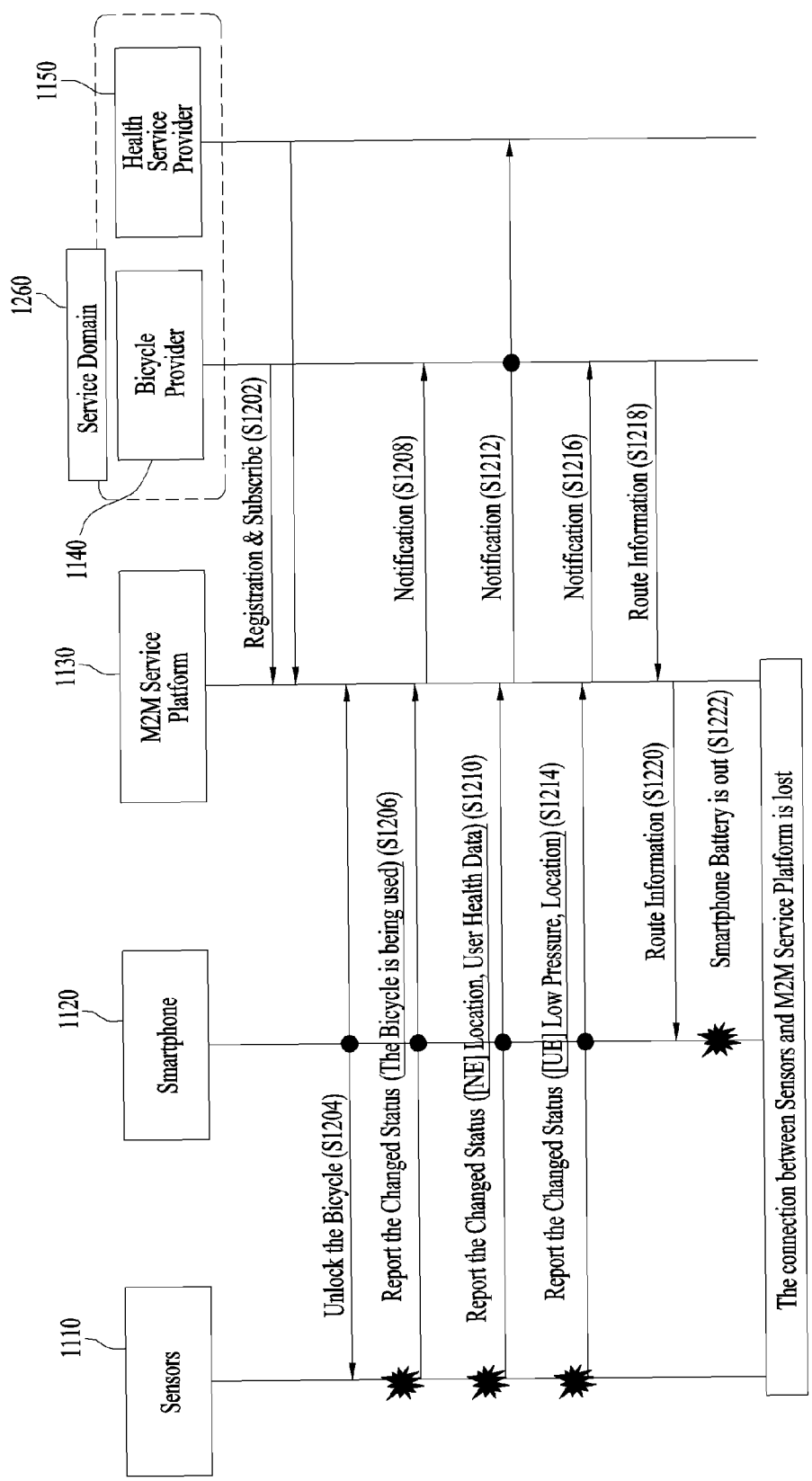
FIG. 12 exemplarily shows an operation of an M2M system.

FIG. 12 exemplarily shows an operation of an M2M system.

Referring to FIG. 12, applications in the service domain 1260 may register the service to the M2M service platform 1130, and may subscribe information regarding the bicycle sharing service in step S1202. Since each resource of the M2M service platform 1130 is owned by the bicycle sharing service provider (or the bicycle provider) 1140 and the health service provider 1150, the application having a need to access other resources may legitimately request resource access rights of the resource. If the request is proper, the application may grant the request on the basis of the service agreement.

In step S1204, the bicycle may be unlocked. For example, the user may allow the smartphone 1120 to be tagged with the bicycle, such that the bicycle may be unlocked through a Near Field Communication (NFC) interface.

In step S1206, if a specific condition is triggered (e.g., if the bicycle is in use), the sensors 1110 may report the bicycle state change to the M2M service platform 1130 through the smartphone 1120 acting as a gateway.

In step S1208, the M2M service platform 1130 may inform the service sharing service provider 1140 of the state change. In this case, the bicycle sharing service provider 1140 may record the in-use status of the bicycle on its own Website.

In step S1210, in case of a normal reporting for managing M2M service, a heart rate of a user may be continuously collected by a handlebar-mounted heart-rate sensor. Health-related information (e.g., heart rate, position, time, etc.) may be periodically reported to the M2M service platform 1130.

In step S1212, the M2M service platform 1130 may inform the bicycle sharing service provider 1140 and the health service provider 1150 of the health service information.

In step S1214, in case of an urgent reporting for handling any emergency, the tire pressure sensor 1110 may detect a low pressure of the front tire while the user rides the bicycle. In this case, the corresponding information along with location information may be immediately transmitted to the M2M service platform through the smartphone 1120.

In step S1216, the M2M service platform 1130 may inform the bicycle sharing service provider 1140 of the state change.

In step S1218, the bicycle sharing service provider 1140 may search for the nearest bicycle repair shop according to the received location information, and may transmit route information to the M2M service platform 1130.

In step S1220, the M2M service platform 1130 may transmit route information to the smartphone 1120 having a navigation application.

However, generally, a gateway for use in the M2M system may be not always connected to a power-supply unit when operating. If gateway power is exhausted, the gateway may not guarantee the connection between the area network and the access network. That is, if the gateway power is exhausted, the entire M2M system may transit to an inoperative state. For example, since the battery of the smartphone 1120 is exhausted in step S1222, the connection between the M2M service platform 1130 and the sensors 1110 may be disconnected. Accordingly, the sensors 1110 and the M2M service platform 1130 cannot mutually report or notify their state information. Therefore, in order to guarantee service persistency according to a state of a specific device, a method for changing or modifying the service configuration of other devices may be required. For example, in the example of FIG. 12, a method for modifying (or changing) the service configuration to change the amount of data so as to guarantee service persistency under a specific situation (e.g., if the gateway power is lower than a threshold value corresponding to a predetermined power) is needed.

Meanwhile, in order to enable changing M2M service configuration according to the state of a gateway or device, it is necessary to assign a degree of importance to each request message transmitted from an M2M device. Therefore, a method for defining the degree of importance of the request message transmitted from an M2M device is proposed. In order to describe the importance of a request, an importance indicator may be added to meta information of the request. The importance indicator may also be referred to as an event category. The event category may be configured by an originator of the request. Then, the request having the event category may be differentially handled on the basis of the policy assigned to each object. The request message transmitted by the M2M device may include 'ec'.

ec: indicate an event category used to handle the corresponding request. The event category relates to how a request for accessing remotely hosted resources is processed in a CMDH CSF. Selection and scheduling of a connection through CMDH may be managed by a policy for differentially handling the event category.

For example, assuming a request message in which an event category is set to a specific value (X), if the request message requests a specific operation to be executed in a hosting CSE different from a local CSE, this request message may be stored in a specific CSE which is on a path or route moving toward the hosting CSE. A message corresponding to the stored request message may be transmitted to the next CSE according to the previously provided policy (related to the event category). Otherwise, after lapse of a predetermined time, the corresponding message may be transmitted by the CSE having stored the request message. The local CSE may indicate a CSE configured to firstly receive the request message. For example, if the originator of the request message is an application on an IN (Infrastructure Node), the local CSE may indicate a CSE on the IN. Likewise, if the originator of the request message is an application on a middle node (MN), the local CSE may indicate a CSE on the MN. In addition, the hosting CSE may indicate a CSE including a resource (or an addressed resource) which is a target of the request message.

Figure 13:
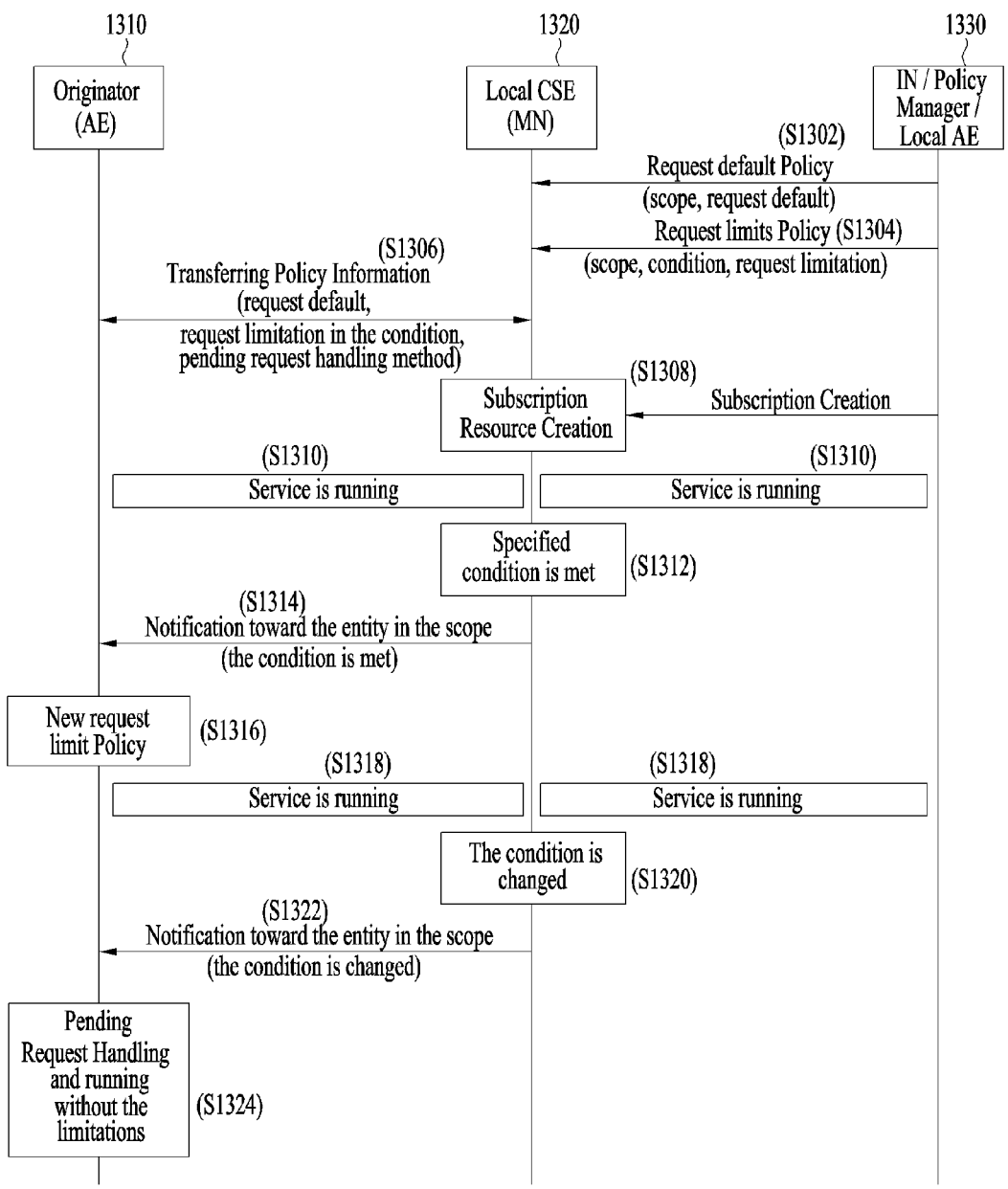
FIG. 13 exemplarily shows an operation for changing an M2M service configuration according to the present invention.

FIG. 13 exemplarily shows an operation for changing an M2M service configuration according to the present invention.

In steps S1302 and S1304, a middle node (MN) 1320 (e.g., CSE of MN) may receive at least one policy information associated with the request, and may store the corresponding information in the form of a resource. In more detail, the MN (e.g., CSE of MN) may receive default policy information associated with the request in step S1302, and may receive limit policy information associated with the request in step S1304. At least one policy information associated with the request may be received from a policy manager configured to manage the entire service policy in the IN (Infrastructure Node) or the M2M system (e.g., one M2M system), or may be received from AE 1330 contained in the MN. For example, the default policy information may include a request default regarding the request, and may include scope information (e.g., see Table 2) and condition information (e.g., see Table 2). For example, the limit policy information may include a request limitation regarding the request, and may include scope information (e.g., see Table 3) and condition information (e.g., see table 3). A detailed description of the default policy information will hereinafter be described with reference to FIG. 14, and a detailed description of the limit policy information will hereinafter be described with reference to FIG. 15.

In step S1306, MN 1320 may transmit at least one policy information received in steps S1302 and S1304 to a device or entity specified in the scope information. For example, the default policy information may be transmitted to an entity (or M2M device) indicated by the scope information contained in the default policy information, and the limit policy information may be transmitted to an entity (or M2M device) indicated by the scope information contained in the limit policy information. In addition, as a non-limiting example, the step S1306 may be performed after completion of steps S1302 and S1304, or the step S1306 may also be performed after completion of step S1302 or S1304. In addition, in step S1306, the at least one policy information may be transmitted by MN 1302 in the form of a notification. Alternatively, when AE 1310 registers to MN 1320, an address (e.g., URI) of a resource including the at least one policy information is transmitted to AE 1310 so that AE 1310 can retrieve the at least one policy information.

In step S1308, MN 1302 may create a subscription resource. For example, if MN 1320 receives at least one policy information in step S1302 or S1304, MN 1320 may create a subscription resources based on condition information (e.g., associatedCondition attribute) contained in the corresponding policy information. For example, when the subscription resource is created, 'criteria' contained in the associatedCondition attribute may be mapped to filterCriteria attribute of the subscription resource (e.g., see Table 3). Creation of the subscription resource will hereinafter be described with reference to FIG. 16. MN 1320 may subscribe to the created subscription resource.

Alternatively, if a condition under which the policy information is applied has been specified in step S1302 or S1304, the policy manager configured to manage the entire service policy in the IN (Infrastructure Node) or the M2M system (e.g., one M2M system) according to a scenario structure may subscribe to MN 1320, and/or the AE 1330 contained in the MN node may subscribe to MN 1320. This subscription may be performed based on the content represented in the specified condition.

In step S1310, if MN 1320 has a policy in which a specific condition is not specified from among at least one policy information received in step S1302 or S1304, MN 1320 may perform an initial service according to the corresponding policy. That is, the service may be performed according to the default policy information and/or the limit policy information, in which the condition information is not specified, from among the at least one policy information. The corresponding policy information may be assigned to an entity (or M2M device) indicated by the scope information contained in each policy information in step S1306.

Alternatively, if all the at least one policy information received at step S1302 or S1304 specify specific conditions but an initial state of MN 1302 does not correspond to any of the specific conditions, the initial service may be performed according to the default policy information.

Alternatively, the state of MN 1320 may satisfy first condition information contained in the at least one policy information received at step S1302 or S1304. In this case, the initial service may be performed according to the policy information including the first condition information.

The policy information for the initial service may be not selected by one of the above-mentioned examples. For example, the policy information for the initial service may be determined based on a combination of all or some parts of the above-mentioned examples. For example, from among the at least one policy information received at step S1302 or S1304, if there is a policy in which a specific condition is not specified, and if the initial state of MN 1302 does not correspond to any condition, the initial service may be performed according to the policy information in which no condition is specified. In another example, from among the at least one policy information received at step S1302 or S1304, if there is a policy in which a specific condition is not specified, and if MN 1320 satisfies the first condition information, the initial service may be performed according to the policy information including the first condition information.

In step S1312, MN 1320 may also satisfy second condition information contained in the at least one policy information received at step S1302 or S1304. For example, MN 1320 may correspond to a condition state different from the initial state (e.g., a state corresponding to a condition contained in the at least one policy information applied in step S1310). For example, a state indicated by the second condition information may include a case in which a remaining power of MN 1320 corresponds to a specific state (e.g., less than Y%).

In step S1314, MN 1320 may transmit or notify a state change detected at step S1312 to an entity (or M2M device) specified in the subscription resource (e.g., notificationURI attribute contained in the subscription resource). In this case, the above state change may be transmitted or notified to the same entity as in the scope of the policy information resource. For example, the scope of an entity (or M2M device) specified in the subscription resource (e.g., notificationURI attribute of the subscription resource) may be identical to the entity (or M2M device) indicated by the scope information contained in the at least one policy information received at step S1302 or S1304. In this case, the notification message transmitted from the MN 1320 may include identification information related to the condition and/or related to the policy. For example, the identification information related to the condition or the policy may include an address (e.g., URI) of a resource including the corresponding policy information, or may include other identification information.

In step S1316, the entity (or M2M device) contained in the scope of the policy and having received the notification message may perform the policy (e.g., default policy or limit policy) associated with the request. The policy associated with the request may be performed according to the default policy information or the limit policy information. Alternatively, the policy associated with the request may be performed according to the policy information indicated by the identification information contained in the notification message received at step S1314. For example, if the condition information contained in the limit policy information indicates that the remaining power amount of MN 1320 corresponds to a specific state (e.g., less than X%), the entity (or M2M device) contained in the scope of the policy and having received the notification message performs a new request limit policy, such as to perform the operation (e.g., transmitting only a request including only the event category which has an importance of X or higher) for performing limitation of the request transmitted to MN 1320. As a result, power consumption used for communication of MN 1320 is reduced, so that service persistency can be maintained.

In step S1318, the service based on the new policy according to the changed condition of MN 1320 may operate. In this case, the new policy may include a default policy or a limit policy.

In step S1320, third condition information contained in the at least one policy information received at step S1302 or S1304 may be satisfied. That is, the state of MN 1320 may correspond to a condition state different from a state condition (corresponding to the second condition information) contained in the at least one policy information applied in step S1318. For example, the remaining power amount of MN 1320 may correspond to a specific state (e.g., less than Y%), and may then exit a power insufficient state through charging (e.g., the remaining power amount of MN 1320 may be equal to or higher than X%).

In step S1322, MN 1320 may transmit or notify a state change detected at step S1320 to an entity (or M2M device) specified in the subscription resource (e.g., notificationURI attribute contained in the subscription resource). In this case, the state change may be transmitted or notified to the same entity as in the scope of the policy information resource. For example, the scope of the entity (or M2M device) specified in the subscription resource (e.g., notificationURI attribute of subscription resource) may be identical to the entity (or M2M device) indicated by the scope information contained in the at least one policy information received at step S1302 or S1304. In this case, the notification message transmitted by MN 1320 may include identification information related to the condition and/or related to the policy. For example, the identification information related to the condition or the identification information related to the policy may include an address (e.g., URI) of a resource including the corresponding policy information, or may include other identification information.

In step S1324, the entity (or M2M device) having received the notification message from MN 1320 may process a pending request due to the limit policy. In this case, for example, the entity may process the pending request according to an operation attribute (e.g., pendingRequest attribute) for processing the pending request in the limit policy information.

Individual steps and/or structures shown in FIG. 13 may be omitted and executed as necessary, or may be modified and executed as necessary. For example, state change of MN 1320 shown in FIG. 13 may include state change based on the remaining power amount. However, the state change of MN 1320 may include a state change according to whether MN 1320 operates based on a battery, or according to whether MN 1320 operates based on a power source connected through a cable. In this case, according to whether MN 1320 initially operates based on the battery, or according to whether MN 1320 initially operates based on the cable power source, the initial service may be performed using one of policy information for a battery-based operation and policy information for a cable-power-based operation.

For example, in step S1310, if MN 1320 operates based on a power source of the bicycle, the initial service may be performed according to the policy information for cable-power-based operation. If MN 1320 operates based on a battery power, the initial service may be performed according to the policy information for the battery-power based operation. In this case, the cable-power-based policy information may be configured as a default policy, and the battery-power-based policy information may be configured as a limit policy.

In addition, for example, if MN 1320 is initially connected to a power cable of the bicycle so that MN 1320 operates based on the cable power and then operates based on the battery power, MN 1320 may detect such a state change in step S1312, and may transmit the state change detected at step S1314 to an entity (or M2M device) specified in the subscription resource or may also inform the entity (or M2M device) of the detected state change. In this case, in step S1316, the entity (or M2M device) having received the notification message may perform the service according to the policy information for the battery-power-based operation. If the entity (or M2M device) follows the battery-power-based policy information, the entity (or M2M device) may limit the request transmitted to MN 1320. As a result, the amount of power consumption used for communication of MN 1320 is reduced so that the service persistency can be maintained.

In addition, if MN 1320 operates based on the battery power and then operates based on the cable power after being connected to the power cable, MN 1320 may detect such a state change in step S1320, and may transmit or notify the state change detected in step S1322 to an entity (or M2M device) specified in the subscription resource. In this case, the entity (or M2M device) having received the notification message may perform the battery-power-based policy in step S1324, such as to process the pending request according to the operation attribute.

In another example, in case that two kinds of policy information are applicable such as the battery-power-based policy information and the cable-power-based policy information, one policy information of two policy information may be configured as the default policy information, and the other policy information may be configured as the limit policy information. Then, the notification message indicating whether the default policy information is used according to the state change of MN 1320 may be transmitted to the entity (or M2M device). In this example, if MN 1320 transits from one state for application of the limit policy information to another state for application of the default policy information, MN 1320 may transmit a notification message indicating that the limit policy information will be discarded to an entity (or M2M device), or may transmit the other notification message indicating return to the default policy information to the entity (or M2M device).

Figure 14:
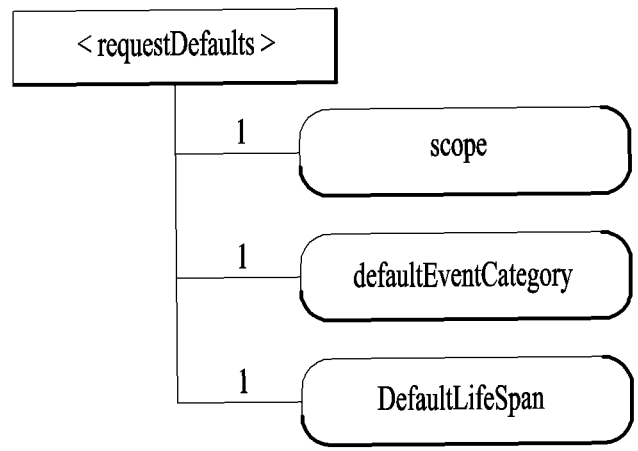
FIG. 14 exemplarily shows default policy information according to the present invention.

FIG. 14 exemplarily shows default policy information according to the present invention. Upon receiving the request, the default policy information may be stored in a resource for the default policy information. For example, the default policy information may be stored in the <requestDefaults> resource. The resource for the default policy information may include information indicating a default value for a request which can be transmitted by a local entity (or M2M device) (e.g., 1310). When a local entity (or M2M device) (e.g., 1310) or a request generated by CSF does not indicate any value regarding each attribute, the resource type (e.g., <requestDefaults>) for the default policy information may be used to indicate a default value which can be used for a CMDH-related parameter. In addition, the default policy information may include a condition to which the default policy information will be applied. In this case, according to whether a state of a specific node (e.g., a hosting CSE or a node including the hosting CSE) satisfies the condition information, a default value for the request may be changed in different ways.

Referring to FIG. 14, the resource for default policy information may include scope information, default event category information (e.g. defaultEventCategory), and default lifespan information (e.g. defaultLifeSpan). The default event category information and the default life span information are information indicating a default value. Although not shown in FIG. 14, the resource for default policy information may include condition information for applying the default policy resource. In this case, the condition information (e.g., associatedCondition) may indicate not only address information (e.g., <link>) of target information to be monitored, but also criteria information (e.g., <criteria>) indicating whether to correspond to a condition. The scope information (e.g., scope) may include identification information (e.g., ID) of an application instance or entity to which the default policy information is applied. The default event category information (e.g., defaultEventCategory) may indicate a default value used when the event category is not defined in the request generated by the device specified in the scope information. For example, when one of the entities (or M2M devices) specified in the scope information (e.g., scope) transmits the request message under a specific condition (e.g., a condition corresponding to condition information of the default policy resource), if any value for the event category is not defined, the value of the default event category information (e.g., defaultEventCategory) may be set to the corresponding value. The default lifespan information (e.g., defaultLifeSpan) may indicate a default value used when the lifespan is not defined in the request generated by the device specified in the scope information.

For example, the resource for default policy information may include information (or attribute information) shown in Table 2. In Table 2, R/W may indicate a read/write (R/W) permission for the corresponding attribute, and may be one of READ/WRITE (RW), READ ONLY (RO), and WRITE ONLY (WO). In addition, multiplicity shown in Table 2 may indicate how many times the corresponding attribute can occur in the <subscription> resource.

TABLE 2

| Attribute Name | Multiplicity | RW/RO/WO | Description |
| --- | --- | --- | --- |
| resourceType (rT) | 1 | WO | See Table 1 |
| expirationTime (eT) | 1 | RW | See Table 1 |
| creationTime (cT) | 1 | RO | See Table 1 |
| lastModifiedTime (lMT) | 1 | RO | See Table 1 |
| accessRightID (aRI) | 0 . . . 1 | RW | See Table 1 |

TABLE 2-continued

| Attribute Name | Multiplicity | RW/RO/WO | Description |
|---|---|---|---|
| scope (sc) | 1 | RW | The scope attribute defines the scope in which the default values of attributes as defined further below shall be applied. The scope attribute is a list of zero or more local App-Inst-IDs or the strings 'deafaultsAE' or 'defaultsCSE'. When an App-Inst-ID appears in the scope attribute, the default attribute values defined further below are applicable for that Application Instance. When the string 'defaultsAE' appears in the scope attribute, the default attribute values defined further below are applicable for all local AEs that are not listed with their App-Inst-ID in any of the provisioned scope attributes of a <requestDefaults> resource. When the string 'defaultsCSE' appears in the scope attribute, the default attribute values defined further below are applicable for all requests that are originating from within the local CSE. Each App-Ints-ID or the strings 'defaultsAE' or 'defaultsCSE' must appear at most once in any of the provisioned scope attributes of a <requestDefaults> resource on the respective CSE. |
| associatedCondition(aC) | 0 . . . 1 | RW | Defines a condition under which a default policy associated with the corresponding request should be applied. In more detail, the condition may include a link of target information to be monitored and a criteria for applying the condition. For example, 'associatedCondition' attributes may link URI of <node> resources including UE attribute information, and may specify the criteria of the corresponding value. <associatedCondition> <link> http://xx.m2mgateway.com/nodeID/node/battery </link> <criteria comparisonOperator=below> 30 </criteria> |
| defaultEventCategory (dEC) | 1 | RW | Default value for the event category parameter ('ec') in a request when any of the originators listed in the scope attribute has not indicated any value for 'ec' in the request. 'defaultEventCategory(dEC)' indicates a default configuration (policy) for Event Category indicating importance of the request. When one of entities specified in the scope transmits a request message, if any one value of the Event Category values is not defined, a value of 'defaultEventCategory' is set to a default value. |

'associatedCondition' shown in Table 2 may be referred to as 'defaultAssociatedCondition(dAC)' to distinguish from 'associatedCondition' shown in Table 3.

Figure 15:
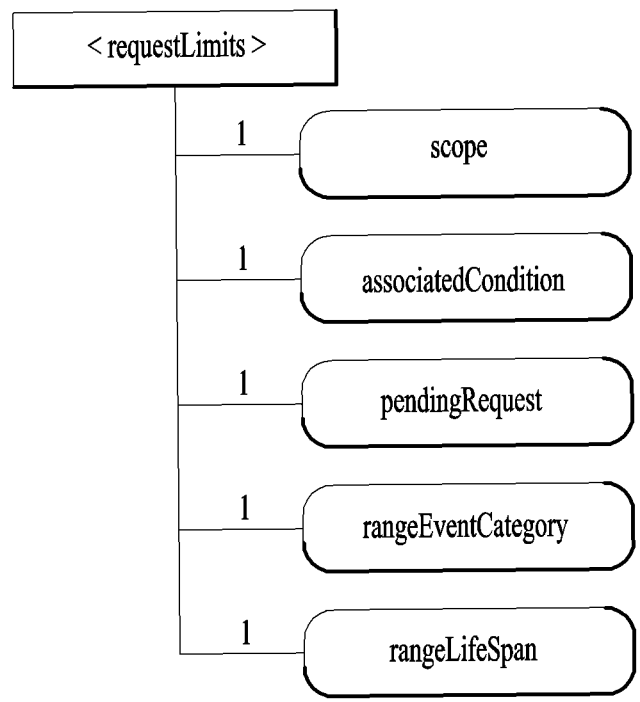
FIG. 15 exemplarily shows limit policy information according to the present invention.

FIG. 15 exemplarily shows limit policy information according to the present invention. The limit policy information for a request may be stored in a resource for the limit policy information. For example, the limit policy information may be stored in <requestLimits> resource. The resource (e.g., <requestLimits> resource) for the limit policy information may define a limit of parameters (e.g., parameters associated with the event category and lifespan) related to a CMDH (Communication and Delivery Handling) function. The corresponding limit may be applied to a request generated by an AE and CSE owned by or registered to the corresponding node. The resource for the limit policy information may indicate the limit range used to verify the CMDH-related parameters when a local entity (or M2M device) (e.g., 1310) transmits the request having the CMDH-related parameters. For example, if the request has the CMDH-associated parameter located outside of the limit range, the request may be denied or refused. In addition, the limit policy information may include condition information for indicating a condition under which the limit policy information will be applied. In this case, the limit policy for the above request may be changed in different ways according to whether a state of a specific node (e.g., a hosting CSE or a node including the hosting CSE) satisfies a condition corresponding to the condition information.

Referring to FIG. 15, the resource for limit policy information may include scope information (e.g., scope), condition information (e.g., associatedCondition), information (e.g., pendingRequest) about a processing scheme for a pending request, scope information of event category (e.g., rangeEventCategory), and lifespan range information (e.g., rangeLifeSpan). The scope information (e.g., scope) may include identification information (e.g., ID) of an application instance or entity to which the limit policy information is applied. The condition information (e.g., associatedCondition) may include not only address information (e.g., <link>) of target information to be monitored, but also criteria information (e.g., <criteria>) indicating whether it corresponds to a condition. The target information to be monitored may indicate specific information of a target device to be monitored within a resource for storing attribute information of the M2M device (e.g., see FIG. 17). Information (e.g., pendingRequest) about a processing scheme for a pending request may define a method for processing a request which is not transmitted to an M2M gateway or device and is pending. For example, information about a processing scheme for a pending request may indicate transmitting all pending requests, transmitting the latest request, transmitting a request having an event category value of a specific scope, transmitting a request having a lifespan of a specific scope, or processing the request according to the next policy. The scope information (e.g., rangeEventCategory) of the event category may indicate the allowed range of the request (or the event category of the request) generated by the device specified in the scope information. The lifespan range information (e.g., range-LifeSpan) may indicate the allowed range of the request (or lifespan of the request) generated by the device specified in the scope information.

For example, the resource for the limit policy information may include information (or attribute information) shown in Table 3. In Table 3, R/W may indicate a read/write (R/W) permission for the corresponding attribute, and may be one of READ/WRITE (RW), READ ONLY (RO), and WRITE ONLY (WO). In addition, multiplicity shown in Table 3 may indicate how many times the corresponding attribute can be generated in the <subscription> resource. In Table 3, App-Inst-ID may indicate the application instance ID.

M2M service configuration can be modified or changed. For this purpose, the state change of the specific device must be notified to another device. In this case, a subscription resource may be used for such notification. The subscription resource may be created using condition information and scope information contained in the default and limit policy information. Assuming that the default and limit policy information include condition information, for example, a specific device (e.g., MN 1320) having the policy may map a resource (e.g., <requestLimit> resource) for the limit policy information to the subscription information (e.g., <subscription> resource), thereby creating the subscription resource. In addition, the entity (e.g., the policy manager configured to manage the entire service policy in the IN (Infrastructure Node) or the M2M system (e.g., one M2M

TABLE 3

| Attribute Name | Multiplicity | R/W | Description |
|---|---|---|---|
| resourceType (rT) | 1 | WO | See Table 1 |
| expirationTime (eT) | 1 | RW | See Table 1 |
| creationTime (cT) | 1 | RO | See Table 1 |
| lastModifiedTime (lMT) | 1 | RO | See Table 1 |
| accessRightID (aRI) | 0 . . . 1 | RW | See Table 1 |
| scope (sc) | 1 | RW | The scope attribute defines the scope in which the limits of attributes as defined further below shall be applied. The scope attribute is a list of zero or more local App-Inst-IDs (or Registered App-Inst-ID or Registered AE's Identifier(s)) where it or the strings 'limitsAE' or 'limitsCSE'. When an App-Inst-ID appears in the scope attribute, the limits for attribute values defined further below are applicable for that Application Instance. When the string 'limitsAE' appears in the scope attribute, the limits of attribute values defined further below are applicable for all local AEs that are not listed with their App-Inst-ID in any of the provisioned scope attributes of a <requestLimits> resource. When the string 'limitsCSE' appears in the scope attribute, the limits of attribute values defined further below are applicable for all requests that are originating from within the local CSE. Each App-Ints-ID or the strings 'limitsAE' or 'limitsCSE' must appear at most once in any of the provisioned scope attributes of a <requestLimits> resource on the respective CSE. |
| associatedCondition (aC) | 0 . . . 1 | RW | Defines a condition under which the limit associated with the corresponding request should be applied. In more detail, the condition may include a link of target information to be monitored and a criteria for applying the condition. For example, 'associatedCondition' attributes may link URI of a <node> resource including attribute information of UE, and may specify the criteria of the corresponding value. <associatedCondition> <link> http.//xx.m2mgateway.com/nodeID/node/battery </link> <criteria comparisonOperator=below> 30 </criteria> |
| pendingRequest (pR) | 1 | RW | Defines a scheme for processing a message which is pending in case that an entity contained in the corresponding scope does not transmit the message because it corresponds to a condition. Sending all pending data Sending latest data Sending specific range of event category and specific range of life span Following the next policy (limit or default) |
| rangeEventCategory (rEC) | 1 | RW | Allowed range for values of the event category parameter ('ec') in a request issued by any of the originators listed in the scope attribute. |
| rangeLifeSpan (rLS) | 1 | RW | Allowed range for values of the lifespan parameter ('ls') in a request issued by any of the originators listed in the scope attribute. |

Figure 16:
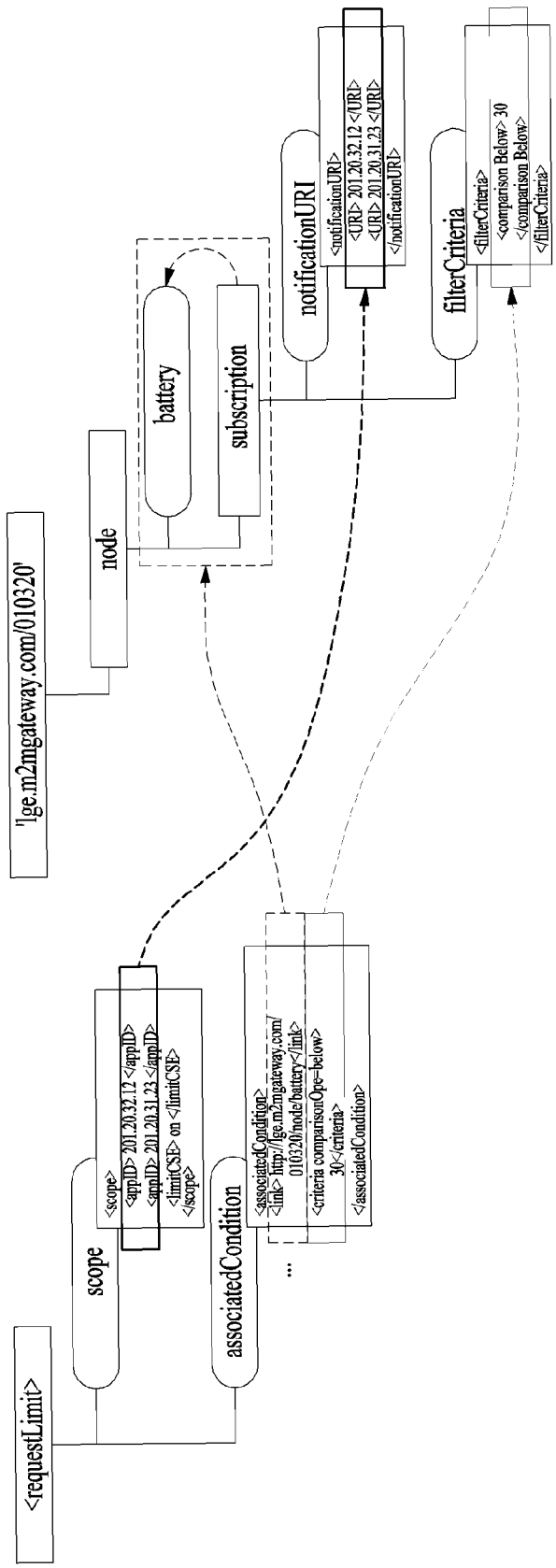
FIG. 16 exemplarily shows an example of mapping the limit policy information to a subscription resource according to the present invention.

FIG. 16 exemplarily shows an example of mapping the limit policy information to a subscription resource according to the present invention.

According to the present invention, a policy of another device (e.g., AE 1310) may be changed according to a state change of a specific device (e.g., MN 1320), such that the system), or the AE contained in the MN node) may create the corresponding subscription information.

When the subscription resource is created, the following mapping rules may be used. For example, a resource (e.g., <scope> resource) for scope information in a resource for the limit policy information may be mapped to a resource (e.g., <notificationURI> resource) for notification address information of subscription resource. In addition, for example, the address information (e.g., <link>) of target information to be monitored in the condition information (e.g., <associatedCondition>) may be mapped to a creation position of the subscription resource (This may be associated with a monitoring issue for a subscribed-to state). In addition, for example, criteria information (e.g., <criteria>) (i.e., criteria value of the detailed condition) of the condition information (e.g., associatedCondition) may be mapped to criteria value information (e.g., filterCriteria) of the subscription resource. In conclusion, the resource of information included in the corresponding policy is paired with the resource of subscription information, so that the corresponding policy can be changed according to a state of a subscribed-to device (or a subscribed-to entity).

Figure 17:
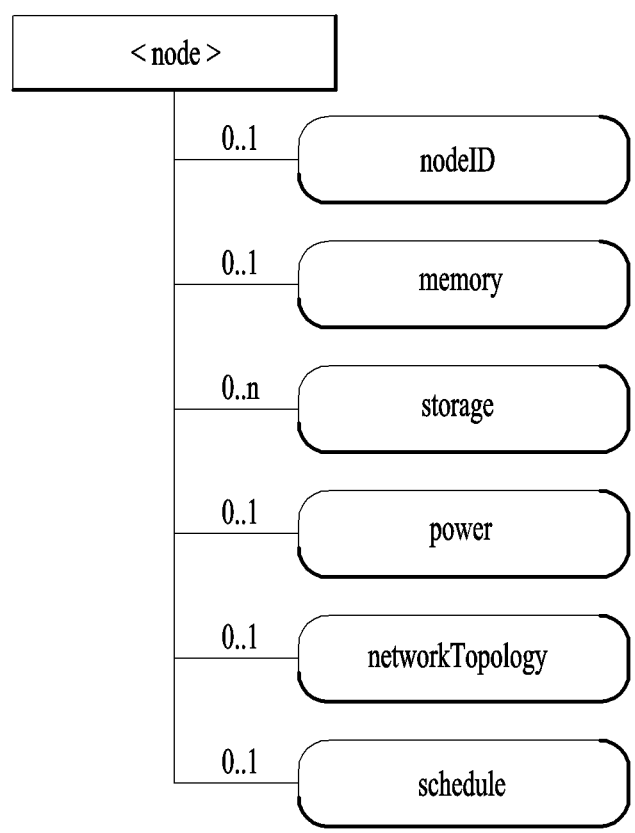
FIG. 17 exemplarily shows a resource structure for storing attribute information of an M2M device according to the present invention.

FIG. 17 exemplarily shows a resource structure for storing attribute information of an M2M device according to the present invention. Since the M2M device can be represented by one node, the resource for storing attribute information of the M2M device may also be referred to as a node resource. The node resource may indicate specific information of the M2M node which can be utilized by other M2M operations (e.g., one M2M operations). For example, when a source CSE transmits the request message to a target CSE, CMDH CSF of the source CSE may determine when the request message will be transmitted to the target CSE based on the reachability schedule of the target CSE. The node resource may include information about a reachability schedule, context information (e.g., a memory and a storage unit), and M2M node (or device) characteristics such as a network topology.

The position of a node resource may be changed according to the node type. For example, ASN may be located below <baseURI> of a local CSE. In addition, for example, AND may be located below <Application> resource of a hosting CSE. In addition, for example, MN may be located below <baseURI> of a local CSE.

Referring to FIG. 17, the node resource may include various kinds of attribute information and child resource. For example, the node resource may include node identification information (e.g., nodeID) as attribute information. In addition, for example, the node resource may include a resource (e.g., <memory> resource) associated with the memory, a resource (e.g., <storage> resource) associated with a storage unit, a resource (e.g., <power> resource) associated with power, a resource (e.g., <networkTopology> resource) associated with network topology, and/or a resource (e.g., <schedule> resource) associated with the schedule. In FIG. 17, numbers located next to the attribute information and the child resource may indicate multiplicity. If the multiplicity is denoted by 0 . . . 1, this multiplicity may indicate an optional item.

Table 4 shows child resources of a node resource.

TABLE 4

| Child Resource Name of <node> | Child Resource Type | Multiplicity | Description |
|---|---|---|---|
| memory | <mgmtObj> | 0 . . . 1 | This resource provides the memory (typically RAM) information of the node. (e.g. the amount of total volatile memory) |
| storage_[i] | <mgmtObj> | 0 . . . n | This resource provides the storage (typically flash or disk) information of the node. (e.g. the amount of total writable persistent storage. |
| power | <mgmtObj> | 0 . . . 1 | The resource provides the power information of the node. (e.g. remaining battery charge). |
| networkTopology | <mgmtObj> | 0 . . . 1 | This resource describes the list of Nodes attached behind the MN node and its relation among the nodes. This attribute is defined in case the Node is MN. See section 9.6.10 for <mgmtObj>. |
| schedule | <schedule> | 0 . . . 1 | This resource defines the reachability schedule information of the node. See section 9.6.16 for <schedule>. |

In Table 4, <mgmtObj> resource type may include management data indicating an individual M2M management function, and may indicate a general structure for mapping to data models of external management technologies (e.g., OMA DM, BBF TR-069, LWM2M). The node specific information such as a memory and storage unit may be acquired through the device management technology or other methods (e.g., JNI (Java Native Interface)) according to the OMA (Open Mobile Alliance) standard specification. Since <mgmtObj> resource type represents a management function including the above two methods, a type of a child resource may be <mgmtObj> resource type.

Figure 18:
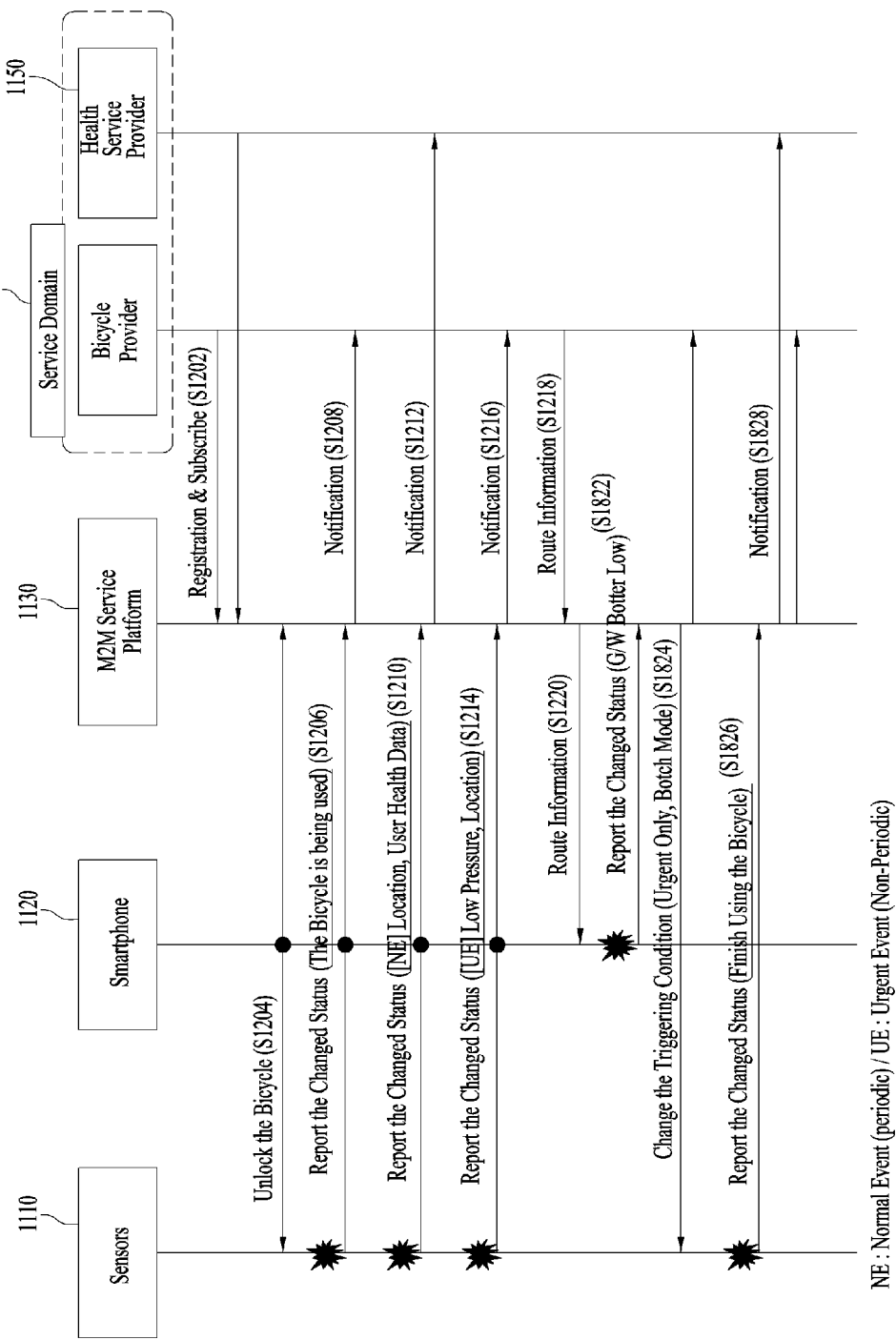
FIG. 18 exemplarily illustrates an operation for changing an M2M service configuration according to the present invention.

FIG. 18 exemplarily illustrates an operation for changing an M2M service configuration according to the present invention.

The descriptions for steps S1204 to S1220 shown in FIG. 18 are identical to the descriptions for steps S1204 to S1220 shown in FIG. 12. Therefore, the descriptions for steps S1204 to S1220 shown in FIG. 12 are herein incorporated by reference.

As compared to the example of FIG. 12, if the state of the smartphone 1120 corresponds to a specific state in step S1822, the smartphone 1120 may report the state change to the M2M service platform 1130. A specific state may include a case in which a malfunction or a faulty operation is expected in a gateway or device. In more detail, for example, the specific state may include a case in which the remaining battery amount of the gateway or device is low (e.g., the remaining battery amount is equal to or less than X%), a case in which battery discharging is expected, a case in which connection lost is expected through location or speed information, or a case in which a normal execution of the service cannot be expected through various triggers. If any one of the above-mentioned cases is satisfied, the gateway or the device may include its own state information into a warning message, and may transmit the warning message to the M2M service platform 1130.

In step S1824, the M2M service platform 1130 may change the M2M service configuration of the bicycle provider 1140 and the sensors 1110 such as to reduce the battery consumption. For example, the M2M service platform 1130 may change the service configuration to "only emergency case". In this case, only the emergency request message may be originated through the sensors 1110. In other cases, the emergency request message may be notified in a batch mode at the last time of the service.

Alternatively, after the M2M service platform 1130 recognizes a state of the gateway or device, the M2M service platform 1130 may command the gateway or device to change the service configuration so as to maintain service persistency. For example, in the normal reporting case (see the steps S1208, S1212, and S1216), the reporting format may be changed to the batch mode or the quasi-real mode. During the batch mode, although data to be transmitted by the gateway or device is present, the data is not transmitted in real time, the data is pending, and the pending data is finally transmitted at a service termination time. During the quasi-real mode, although data to be transmitted by the gateway or device is present, the data is not transmitted in real time, the data is pending, and the pending data is transmitted in real time when the gateway or device can recover a state in which service persistency can be maintained. In contrast, for example, in the case of emergency reporting (e.g., see the step S1822), the reporting format remains unchanged.

In step S1826, the bicycle user reaches a destination, and may park the bicycle at a designated place. In this case, the sensors 1110 may report the accumulated information and the normal event subscription information to the M2M service platform 1130 through the smartphone 1120.

In step S1828, the service platform 1130 may inform the bicycle provider 1140 and the health service provider 1150 of the usage of the shared bicycle.

In the example of FIG. 18, although the smartphone 1120 operating as the M2M gateway is a separate entity from the M2M service platform 1130, the M2M gateway may also serve as the M2M service platform 1130 in other examples.

Figure 19:
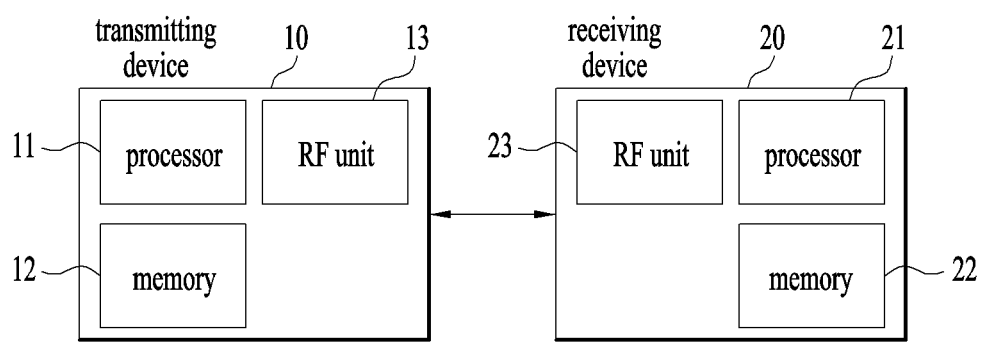
FIG. 19 illustrates a block diagram of a device according to embodiment(s) of the present invention.

FIG. 19 illustrates a block diagram of a device according to embodiment(s) of the present invention. In the present invention, each of M2M gateway, M2M server, or M2M device may operate as a transmitting device 10 or a receiving device 20.

The transmitting device 10 and the receiving device 20 respectively include radio frequency (RF) units 13, 23 for transmitting and receiving radio signals carrying information, data, signals, and/or messages, memories 12, 22 for storing information related to communication in a wireless communication system, and processors 11, 21 operatively connected to the RF units 13, 23 and the memories 12, 22 and configured to control the memories 12, 22 and/or the RF units 13, 23 so as to perform at least one of the above-described embodiments of the present invention.

The memories 12, 22 may store programs for processing and control of the processors 11, 21 and may temporarily storing input/output information. The memories 12, 22 may be used as buffers.

The processors 11, 21 control the overall operation of various modules in the transmitting device 10 or the receiving device 20. The processors 11, 21 may perform various control functions to implement the present invention. The processors 11, 21 may be controllers, microcontrollers, microprocessors, or microcomputers. The processors 11, 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11, 21. If the present invention is implemented using firmware or software, firmware or software may be configured to include modules, procedures, functions, etc. performing the functions or operations of the present invention. Firmware or software configured to perform the present invention may be included in the processors 11, 21 or stored in the memories 12, 22 so as to be driven by the processors 11, 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. A signal processing process of the receiving device 20 is the reverse of the signal processing process of the transmitting device 10. Under the control of the processor 21, the RF unit 23 of the receiving device 10 receives RF signals transmitted by the transmitting device 10. The processor 21 decodes and demodulates the radio signals received through the receive antennas and restores data that the transmitting device 10 wishes to transmit.

The RF units 13, 23 include one or more antennas. An antenna performs a function of transmitting signals processed by the RF units 13, 23 to the exterior or receiving radio signals from the exterior to transfer the radio signals to the RF units 13, 23. FIG. 9 illustrates that the transmitting device and the receiving device communicate through RF units respectively, but the present invention is not limited thereto. In the present invention, the transmitting device and the receiving device may communicate through a wired network. In this case, the RF unit may be replaced with a network interface unit (NIU).

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The base station may be referred to as a fixed station, a node-B (NB), an evolved node-B (eNB), an access point (AP), etc. A terminal may be referred to as a user equipment (UE), a mobile station (MS), a mobile subscriber station (MSS), etc.

The embodiments of the present invention may be implemented by various means, for example, hardware, firmware, software, or a combination thereof. In a hardware implementation, an embodiment of the present invention may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software implementation, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a communication apparatus such as a terminal, a server, a gateway, etc.

The invention claimed is:

1. A method for notifying a state change by a machine-to-machine (M2M) gateway in an M2M system, the method comprising:
storing policy information by the M2M gateway, wherein the policy information includes limit policy information, the limit policy information includes scope information indicating one or more devices to which the limit policy information is applied, an allowed event category set indicates allowed values for an event category parameter in a request generated by the one or more devices, and condition information indicates a condition under which the limit policy information is applied;
transmitting a second notification to the one or more devices indicated by the stored scope information, the second notification including the allowed event category set; and
when the M2M gateway detects a state change of the M2M gateway indicated by the condition information, transmitting a first notification indicating the state change of the M2M gateway to the one or more devices,
wherein whether the request generated by the one or more devices is transmitted is determined according to whether the request has an event category parameter value within the allowed event category set.

2. The method according to claim 1, wherein the first notification includes identification information corresponding to the policy information, and
wherein when the one or more devices indicated by the scope information receive the first notification, the one or more devices perform an M2M service according to the policy information indicated by the identification information.

3. The method according to claim 1, wherein the policy information includes default policy information, and the default policy information includes a default value for the event category parameter in the request generated by the one or more devices.

4. The method according to claim 3, wherein the default policy information includes a default attribute for the request generated by the one or more devices and a state of the M2M gateway to which the default policy information is applied, and
wherein, when a state of the M2M gateway corresponds to the state of the M2M gateway to which the default policy information is applied and when a specific attribute of the request generated by the at least one of the one or more devices is not designated, the default attribute contained in the default policy information is applied.

5. The method according to claim 1, further comprising:
creating a resource for subscription,
wherein the resource for subscription is created based on the condition information by the M2M gateway.

6. The method according to claim 5, wherein the resource for subscription includes first information about an address of a device to which the notification is transmitted and second information about a criteria value at which the notification is performed, and
wherein creating the resource for subscription includes mapping the scope information to the first information and mapping a value of a state indicated by the condition information to the second information.

7. The method according to claim 1, wherein the condition information includes address information of target information to be monitored and criteria information indicating whether the condition is satisfied.

8. The method according to claim 1, wherein the second notification further includes information indicating a processing scheme for a request.

9. The method according to claim 8, wherein the processing scheme for the request includes at least one of transmitting all pending requests, transmitting the latest request, transmitting a request having an event category parameter of a specific range or a request having a lifespan of a specific range, or processing a request according to the next policy.

10. A machine-to-machine (M2M) gateway of an M2M system, the M2M gateway comprising:
a network interface unit; and
a processor,
wherein the processor is configured to:
store policy information at the M2M gateway, the policy information including limit policy information, the limit policy information including scope information indicating one or more devices to which the limit policy information is applied, an allowed event category set indicating allowed values for an event category parameter in a request generated by the one or more devices, and condition information indicating a condition under which the limit policy information is applied,
transmit, through the network interface unit, a second notification to the one or more devices indicated by the stored scope information, the second notification including the allowed event category set, and
when the M2M gateway detects a state change of the M2M gateway indicated by the condition information, transmit, through the network interface unit, a first notification indicating the state change of the M2M gateway to the one or more devices, and
wherein whether the request generated by the one or more devices is transmitted is determined according to whether the request has an event category parameter value within the allowed event category set.

11. The M2M gateway according to claim 10, wherein the first notification includes identification information corresponding to the policy information, and wherein when the one or more devices indicated by the scope information receive the first notification, the one or more devices perform an M2M service according to the policy information indicated by the identification information.

12. The M2M gateway according to claim 10, wherein the policy information includes default policy information, and the default policy information includes a default value for the event category parameter in the request generated by the one or more devices.

13. The M2M gateway according to claim 12, wherein the default policy information includes a default attribute for the request generated by the one or more devices and a state of the M2M gateway to which the default policy information is applied, and
wherein, when a state of the M2M gateway corresponds to the state of the M2M gateway to which the default policy information is applied and when a specific attribute of the request generated by the at least one of the one or more devices is not designated, the default attribute contained in the default policy information is applied.

14. The M2M gateway according to claim 10, wherein the processor is further configured to create a resource for subscription, and
wherein the resource for subscription is created based on the condition information by the M2M gateway.

15. The M2M gateway according to claim 14, wherein the resource for subscription includes first information about an address of a device to which the notification is transmitted and second information about a criteria value at which the notification is performed, and
wherein creating the resource for subscription includes mapping the scope information to the first information and mapping a value of a state indicated by the condition information to the second information.

16. The M2M gateway according to claim 10, wherein the condition information includes address information of target information to be monitored and criteria information indicating whether the condition is satisfied.

17. The M2M gateway according to claim 10, wherein the second notification further includes information indicating a processing scheme for a request.

18. The M2M gateway according to claim 17, wherein the processing scheme for the request includes at least one of transmitting all pending requests, transmitting the latest request, transmitting a request having an event category parameter of a specific range or a request having a lifespan of a specific range, or processing a request according to the next policy.

* * * * *